(12) United States Patent
Maine, Jr.

(10) Patent No.: US 6,732,856 B2
(45) Date of Patent: May 11, 2004

(54) MODULAR CONVEYOR BELT

(75) Inventor: Robert E. Maine, Jr., Hebron, MD (US)

(73) Assignee: Maryland Wire Belts, Inc., Church Creek, MD (US)

(*) Notice: Subject to any disclaimer, the term of this patent is extended or adjusted under 35 U.S.C. 154(b) by 0 days.

(21) Appl. No.: 10/079,582

(22) Filed: Feb. 22, 2002

(65) Prior Publication Data

US 2002/0117382 A1 Aug. 29, 2002

Related U.S. Application Data

(60) Provisional application No. 60/271,429, filed on Feb. 27, 2001.

(51) Int. Cl.[7] .............................................. B65G 17/06
(52) U.S. Cl. .................. 198/850; 198/851; 198/852; 198/853
(58) Field of Search ................. 198/850, 851, 198/852, 853

(56) References Cited

U.S. PATENT DOCUMENTS

| | | | |
|---|---|---|---|
| 3,066,549 A | | 12/1962 | Benjamin |
| 3,231,069 A | | 1/1966 | Lanham |
| 3,628,834 A | * | 12/1971 | Anderson ................ 74/249 |
| 3,804,232 A | | 4/1974 | Freiwald et al. |
| 4,597,747 A | | 7/1986 | Lapeyre |
| 4,815,270 A | * | 3/1989 | Lapeyre ................ 198/853 |
| 4,815,271 A | | 3/1989 | Lapeyre |
| 4,832,187 A | | 5/1989 | Lapeyre |
| 4,882,901 A | * | 11/1989 | Lapeyre ................ 198/853 |
| 5,092,118 A | * | 3/1992 | VanDeMark ............ 198/851 |
| 5,174,439 A | | 12/1992 | Spangler et al. |
| 6,347,699 B1 | * | 2/2002 | Ramsey ................ 198/852 |

FOREIGN PATENT DOCUMENTS

| | | |
|---|---|---|
| CH | 372243 | 11/1963 |
| DE | 1932428 | 10/1971 |
| WO | WO 93/20366 | 10/1993 |

* cited by examiner

Primary Examiner—Douglas Hess
(74) Attorney, Agent, or Firm—Burns, Doane, Swecker & Mathis, L.L.P.

(57) ABSTRACT

A modular conveyor belt assembly having a plurality of modular links, each of the modular links including a pair of first projecting legs and a pair of second projecting legs, the first projecting legs each having an inwardly projecting engagement element and the second projecting legs each having an engagement slot. The plurality of modular links are interconnected to form a conveyor belt through engagement of the engagement elements in the engagement slots.

21 Claims, 20 Drawing Sheets

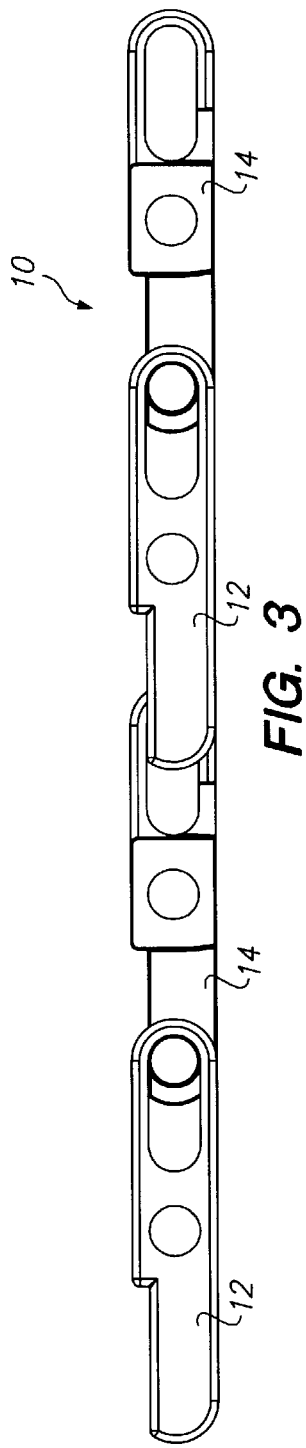
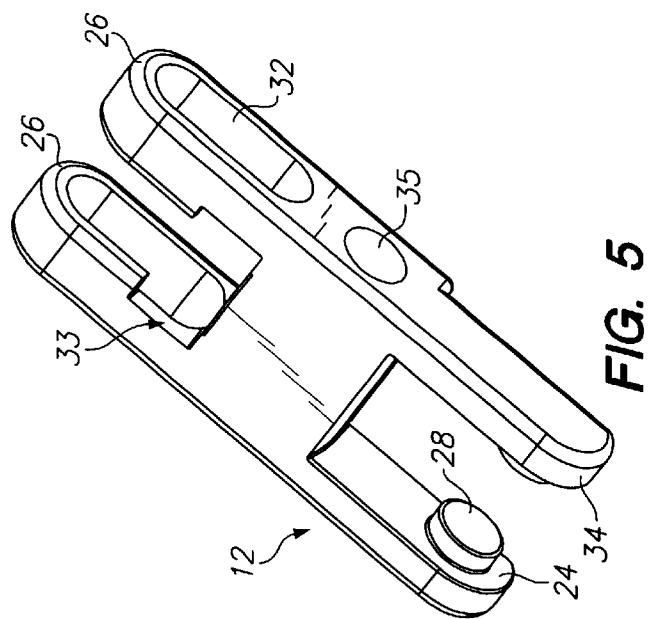
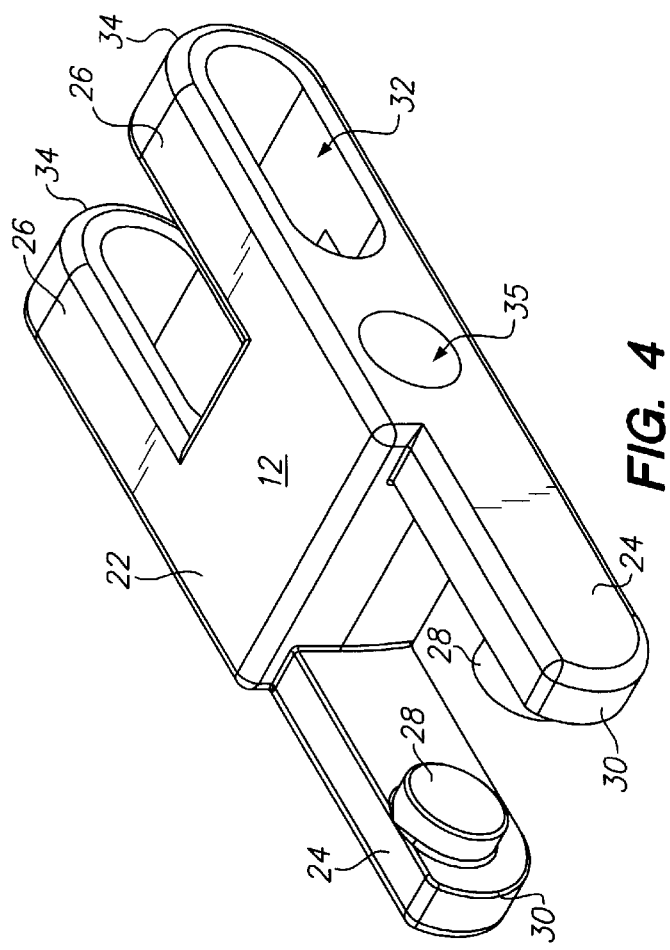
FIG. 3
FIG. 4
FIG. 5

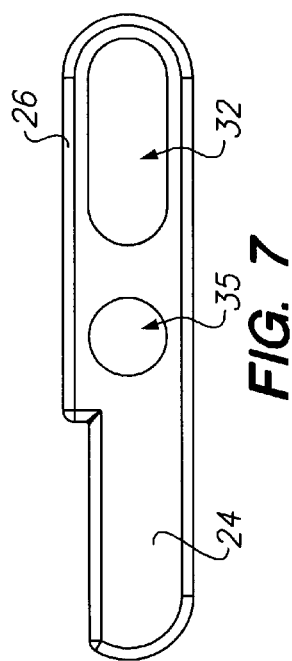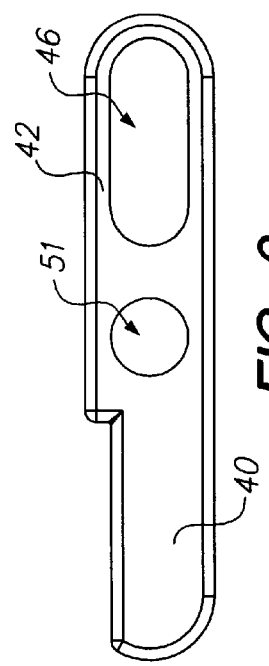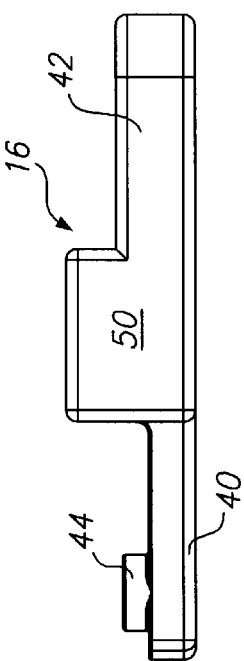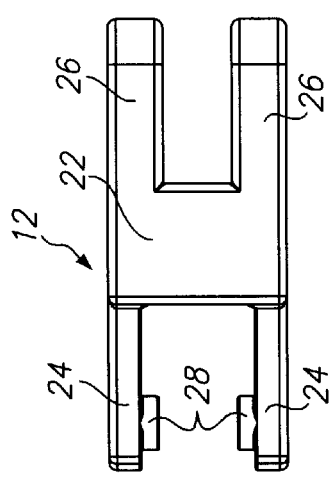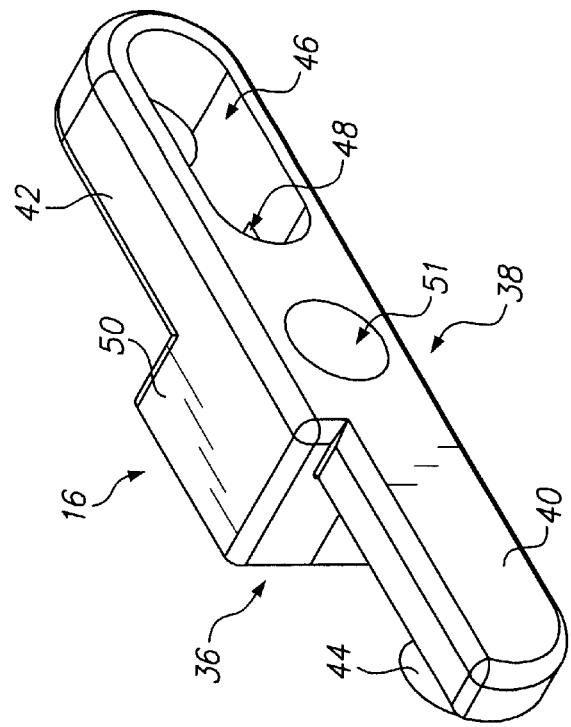

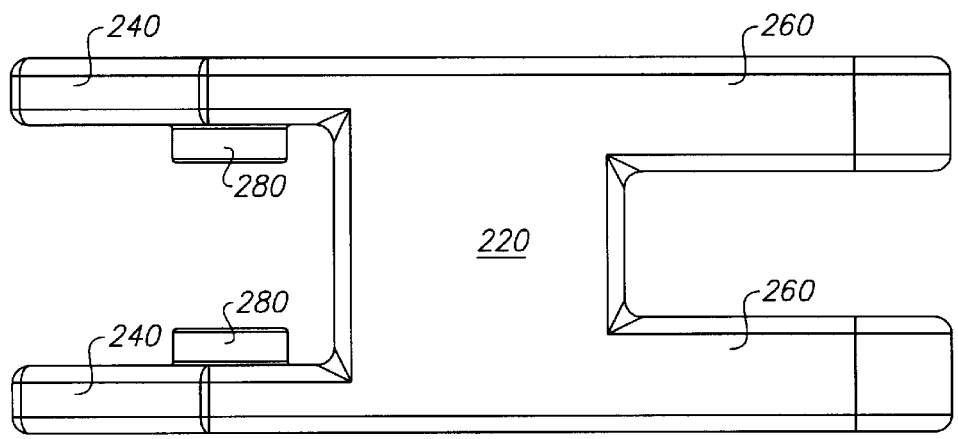
FIG. 23
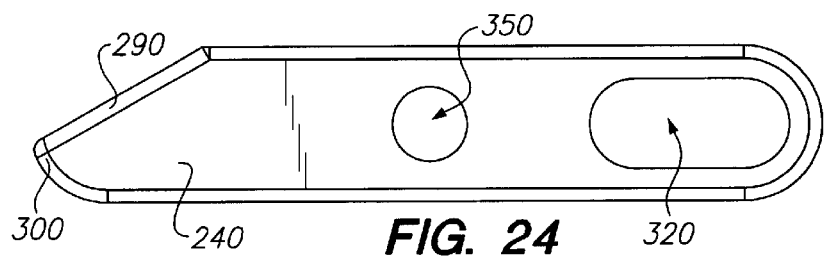
FIG. 24
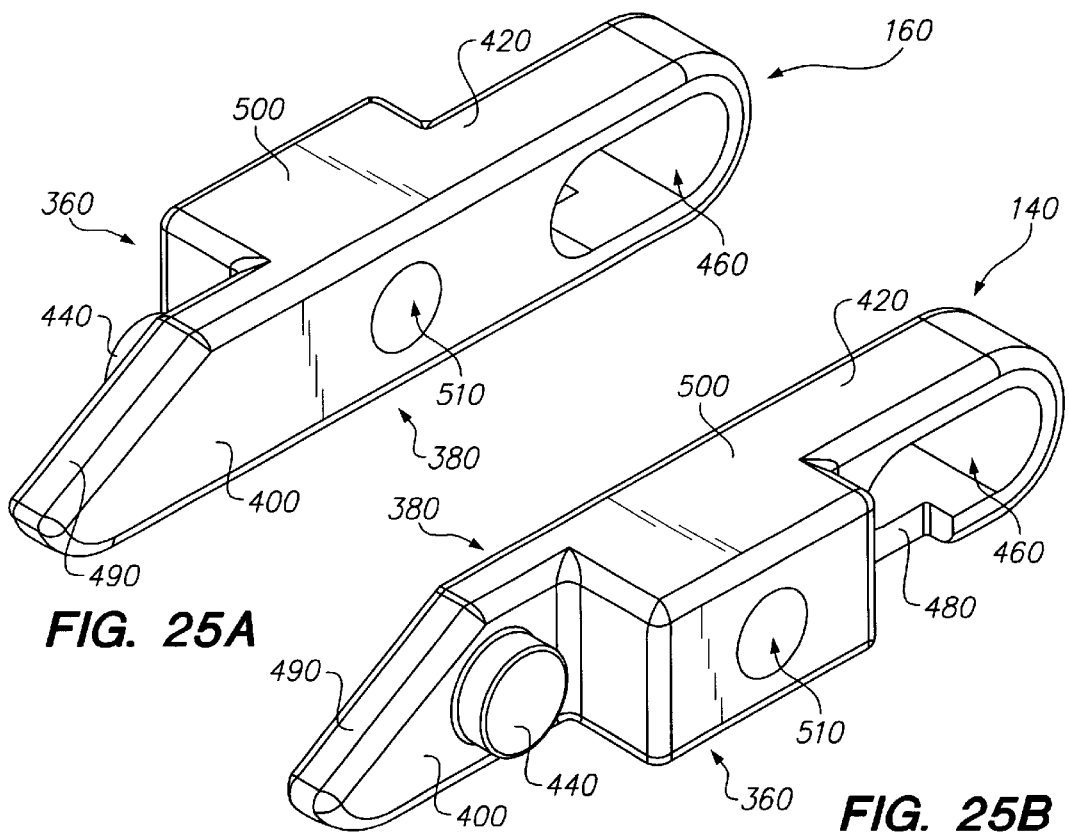
FIG. 25A
FIG. 25B

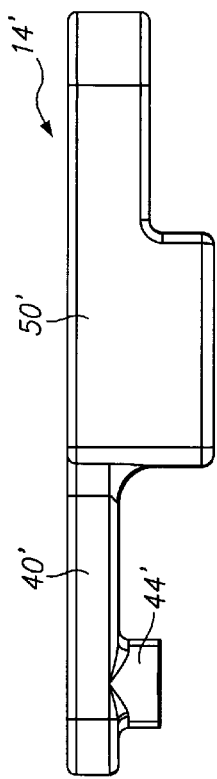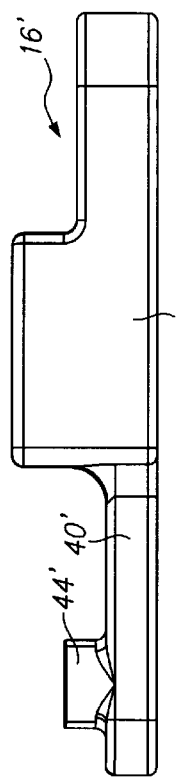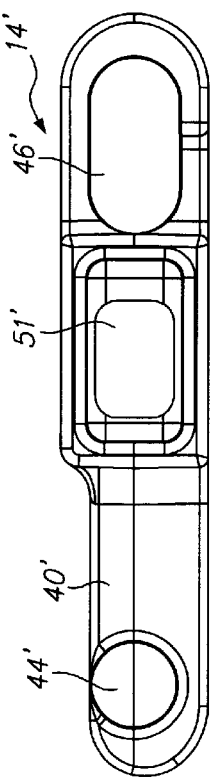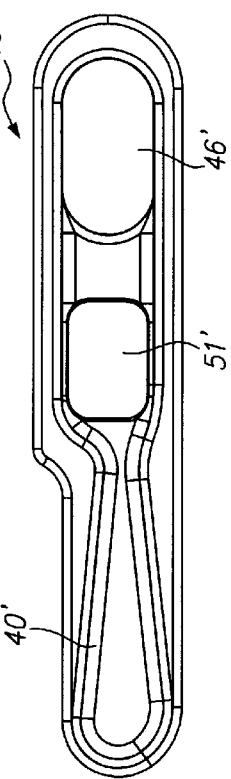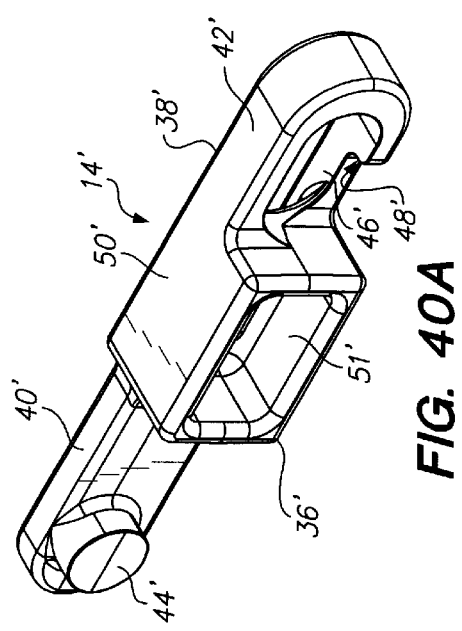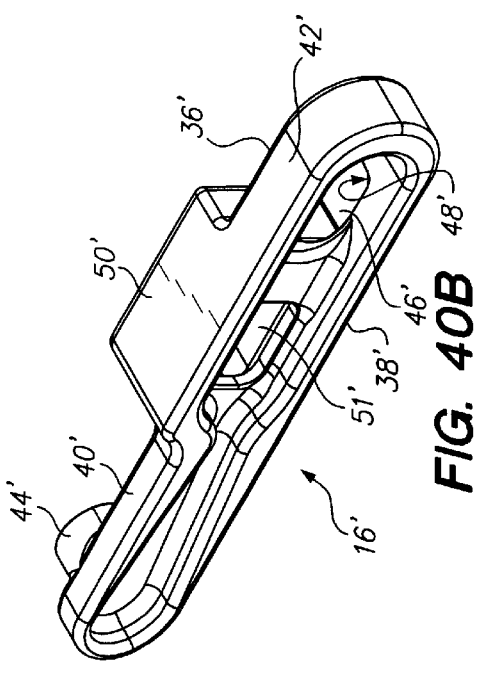

MODULAR CONVEYOR BELT

CROSS-REFERENCE TO RELATED APPLICATION

This application claims priority under 35 U.S.C. §119 to U.S. Provisional Application Serial No. 60/271,429, filed on Feb. 27, 2001; the entire content of which is hereby incorporated by reference.

TECHNICAL FIELD

The present invention is directed to a modular conveyor belt, and more particularly, to a modular conveyor belt including a plurality of modular links which are assembled without the use of welding or transverse connectors.

BACKGROUND OF THE INVENTION

Wire conveyor belts serve important functions in industry because of their durability and versatility in performing a wide variety of functions under differing conditions. However, wire grid conveyor belts require widthwise-extending rods to interconnect wire lengths which have been bent to form a plurality of links, as shown for example in U.S. Pat. No. 5,622,252, and woven metal wire belts require interweaving and welding wherein widthwise-extending rods are used to interconnect wire lengths which have been wound into spirals, as set forth for example in U.S. Pat. No. 4,491,003. Generally, metal wire belts must be assembled at the belt manufacturer's site to a user's specifications. Also, welding and other steps, in assembly of the wire spirals and connecter rods, are carried out manually.

In order to overcome some of the manufacturing complications encountered with metal wire belts, plastic and ceramic conveyor belts utilizing modules with inter-fitting link ends have become well known and well worked. Generally, in such belts, a pivot rod connects the interfitting link ends so that the modules can be assembled with the rods to form a continuous belt. The rods permit angular rotation between adjacent modules as required when the belt goes around sprockets or rolls on the conveyors while at the same time the rods connect and transmit the forces between the adjacent modules. In practice these connecting rods are subject to large forces. Due to the broad range of application in which plastic conveyors are commonly used, the forces and the reaction of the rods to these forces is many times unpredictable. It is of utmost importance that the rods that connect the modules be positively captured within the conveyor belt assembly. Failure to accomplish such results in numerous problems, not the least of which is the belt actually falling apart in use. Other problems include interference between partially exposed rods and the surrounding conveyor structure. Additionally, as a practical matter the rods must be easily insertable and removable from the belt, as such is normally required during belt assembly, belt installation or belt repair. Furthermore, it is desirable to accomplish this without the use of any special equipment or tool. Such is particularly important when considering field installation and repair since special tools represent both added costs and inconvenience to the user.

Because of the significant problems that loose conveyor rods have caused, numerous methods have been used to capture the pivot rods connecting the links in plastic conveyor belts. Such methods include forming "button" heads on the ends of the rods, but these button heads can be knocked off and they must be removed for replacement of the rods. The button heads have generally been formed by melting the ends of the rod to provide enlarged ends or button heads which are larger in diameter than the rod hole and thereby prevent the rod from moving inwardly through the belt, i.e., the enlarged heads provides means to capture the rods. However, there are numerous problems with this solution to the problem of capturing the rods. First, special equipment is normally required to thermally form the heads. Secondly, the button heads are exposed on the edges of the belt in a vulnerable location since any protuberance on a conveyor can either wear or knock the heads of the rods thus allowing the rods to fall out of the belt. Thirdly, there is the problem of dimensional instability which leads to Poisson effect, i.e., when a material undergoes a change in dimension due to an elastic deformation along one axis, an opposite change in dimension or deformation occurs along a perpendicular axis. The amount of this opposite deformation is determined by Poisson's ratio. When the conveyor belt is in operation the rods are subjected to compressive forces perpendicular to the axis of the rod. These compressive forces can deform the rod making the diameter of the rod smaller in accordance with the theory of elasticity. In accordance with the Poisson effect the rod then elongates along its axis; in effect, the rod becomes longer than its original length. This in turn causes the rod to protrude further beyond the edge of the belt causing further problems of interference with conveyor structure which can result in significant belt damage and possible down time.

Another way of capturing the rod within the belt is to form a circumferential bead the internal diameter of which is less than the diameter of the rod, the beads being formed at the ends of the rod holes. Such is shown in U.S. Pat. No. 2,911,091, for example. However, such capturing of the rod is more or less permanent which doesn't take into consideration the need for disassembly and repair of the belt from time to time. Another solution to the problem of capturing a rod end is disclosed in U.S. Pat. No. 3,726,569, in which the end of the rod hole and the outermost link end are plugged to prevent the rod from escaping from the belt. U.S. Pat. No. 4,709,807, also discloses a similar arrangement. However, such plugs can be inadequate due to the rod elongation force caused by Poisson's effect mentioned above and threaded plugs can cause stress risers and possible failure, in addition to extra manufacturing time and the cost of threading both the plug and the hole.

Another known method of capturing the rod is a snap-fitting end cap installed axially into the module rod hole or transversely into the module blocking off the rod hole. However, the general design requirement for snap-fit assembly as currently known requires that the plug or end cap be flexible so that its snap projection can deform during installation. This flexibility, which is normally accomplished by placing the snap-fit projection at the ends of two flexible arms, also weakens the plug or cap and reduces its ability to resist rod elongation forces. Further, end caps which are installed axially into the rod hole place the entire rod elongation force caused by the Poisson effect on relatively small snap-fit projections. This results in the rods "popping" the end caps off of the end modules.

There is thus a need in the art for an improved modular conveyor belt which overcomes the disadvantages heretofor encountered when inter-linking modules to form a conveyor belt.

SUMMARY OF THE INVENTION

The present invention overcomes these disadvantages by providing a modular conveyor belt assembly having a plurality of modular links, each of the modular links including at least one pair of first projecting legs and at least one pair of second projecting legs, the first projecting legs each having an inwardly projecting engagement element and the second projecting legs each having an engagement slot. The plurality of modular links are interconnected to form a conveyor belt through engagement of the engagement elements in the engagement slots.

A further aspect of the present invention provides a modular conveyor belt assembly including a plurality of modular links, each of the modular links having substantially planar opposing sides, at least one pair of first projecting legs, and at least one pair of second projecting legs. The first projecting legs each have a projecting engagement element and the second projecting legs each have an engagement slot. The plurality of modular links are interconnected to form the conveyor belt, a first one of the engagement elements of a first one of the plurality of modular links cooperating with the engagement slot of a second one of the plurality of modular links and a second one of the engagement element of the first one of the plurality of modular links cooperating with the engagement slot of a third one of the plurality of modular links.

BRIEF DESCRIPTION OF THE DRAWINGS

These, and other, objects, features and advantages of the present invention will become more readily apparent to those skilled in the art upon reading the following detailed description, in conjunction with the appended drawings, in which:

FIG. 3 is a side elevational view thereof;

FIG. 4 is a top perspective view of a main body link of the conveyor belt shown in FIG. 1;

FIG. 5 is a bottom perspective view thereof;

FIG. 6 is a top plan view thereof;

FIG. 7 is a side elevational view thereof;

FIG. 8 is a top perspective view of a left edge link in the conveyor belt shown in FIG. 1;

FIG. 9 is a side elevational view thereof;

FIG. 10 is a top plan view thereof;

FIG. 23 is a top plan view thereof;

FIG. 24 is a side elevational view thereof;

FIGS. 25A and 25B are top perspective views of opposing right and left edge links in the conveyor belt shown in FIG. 17;

FIGS. 40A and 40B are top perspective views of opposing right and left edge links in the conveyor belt shown in FIG. 33;

FIGS. 41A and 41B are top plan views thereof;

FIGS. 42A and 42B are side elevational views thereof; and

DESCRIPTION OF THE PREFERRED EMBODIMENTS

Figure 1:
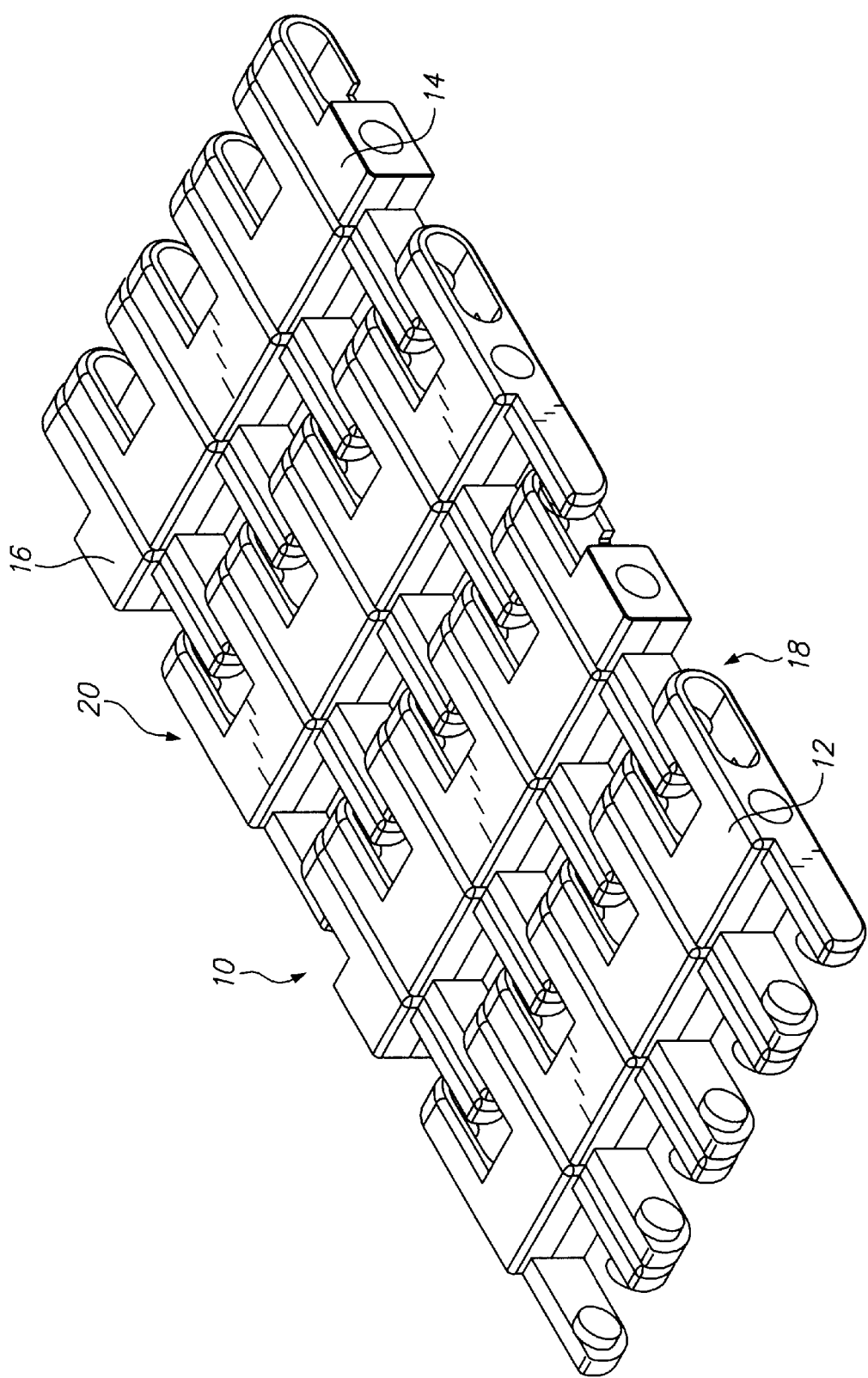
FIG. 1 is a perspective view of a conveyor belt according to a first preferred embodiment of the present invention.
Figure 2:
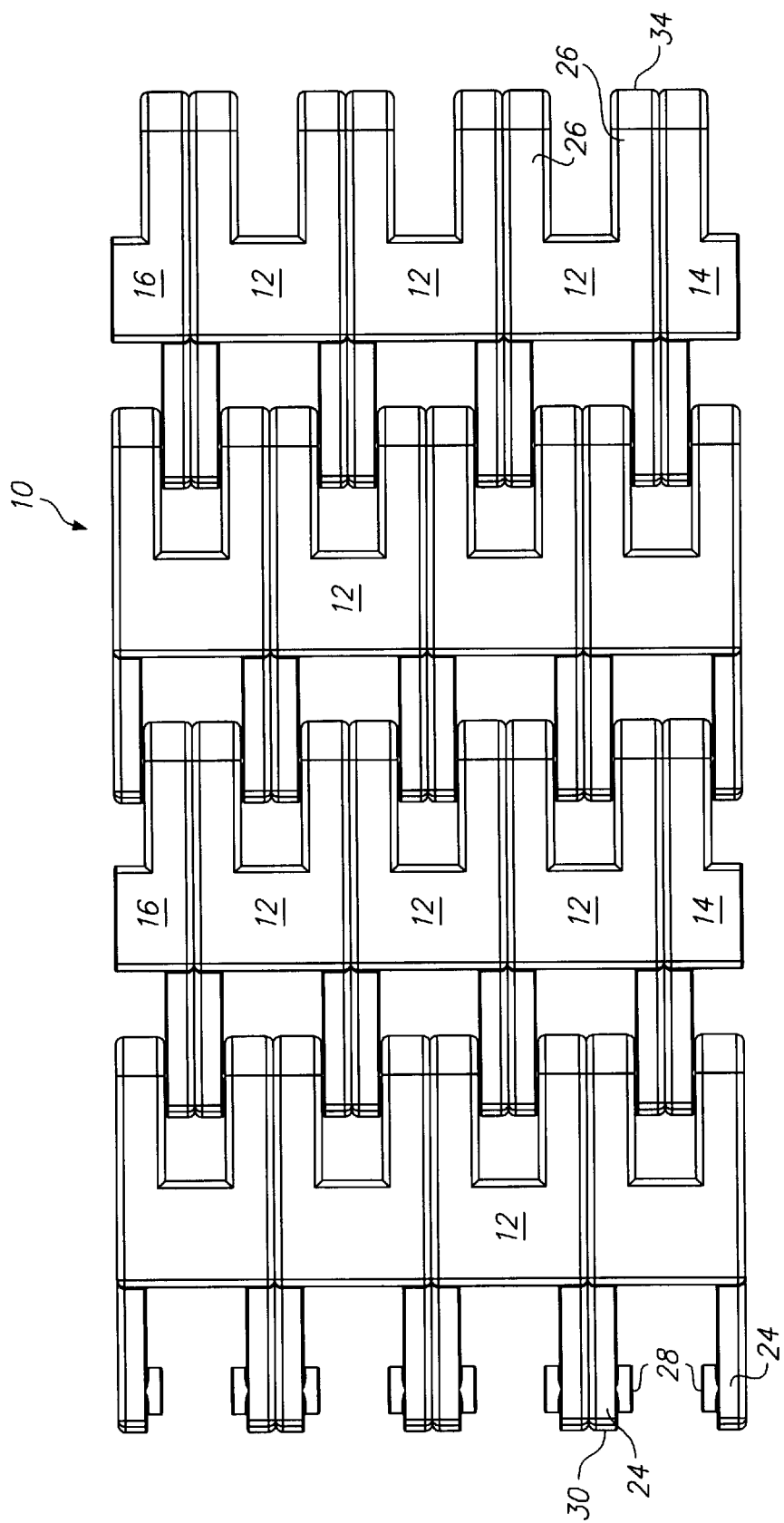
FIG. 2 is a top plan view thereof.

Referring to FIGS. 1–3, a conveyor belt according to a first embodiment of the present invention is designated generally by reference numeral 10. The conveyor belt 10 includes a plurality of main body links 12, right edge links 14, and left edge links 16. The main body links 12 are arranged in interconnected transverse rows so as to define a desired width of conveyor belt 10, and a plurality of rows formed from the main body links 12 are then interconnected in a longitudinal direction so as to form the desired length for the conveyor belt 10. A plurality of right edge links 14 are disposed on the right edge 18 of the main body links 12 while the left edge links 16 form the edge treatment for the left edge 20 of the main body links 12.

Referring to FIGS. 4–7, the main body link 12 is shown in greater detail. More specifically, main body link 12 includes a central body area 22, a first pair of projecting legs 24 and a second pair of projecting legs 26. As best shown in FIG. 7, main body links 12 also include a central though-opening 35, the purpose of which will be explained in detail below. Each of the first projecting legs 24 further include an inwardly projecting boss 28 disposed proximal to the free end 30 of each of the first projecting legs. In a preferred embodiment, the center of the boss 28 is disposed approximately 0.188 inches from the free end 30 of the first leg. The boss 28 is preferably circular and has a diameter of approximately 0.300 inch. Each of the second projecting legs 26 includes a slot shaped opening 32 extending entirely through each of the legs 26 in the transverse direction as best shown in FIG. 5. Each of the slots preferably has a end-to-end length of approximately 0.625 inch. Although these dimensions are merely examples of a preferred embodiment and other sizes are of course possible, in so designing other sizes it is preferable for the slot in the leg to have a length greater than two times that of the diameter of the boss. As shown in FIG. 5, the underside of each second projecting leg 26 further includes a notch 33, the purpose of which will be explained in detail below. Each of the main body links 12 has a preferred overall length of approximately 2.60 inches from the free end 34 of the second leg to the free end 30 of the first leg. The links 12 also have a preferred overall width of approximately 0.995 inch. Although specific dimensions and configurations are set forth above for the construction of a preferred embodiment of main body links 12, it should be apparent to one skilled in the art that other sizes, dimensions and configurations could of course also be used without departing from the true spirit of the present invention.

Figure 11:
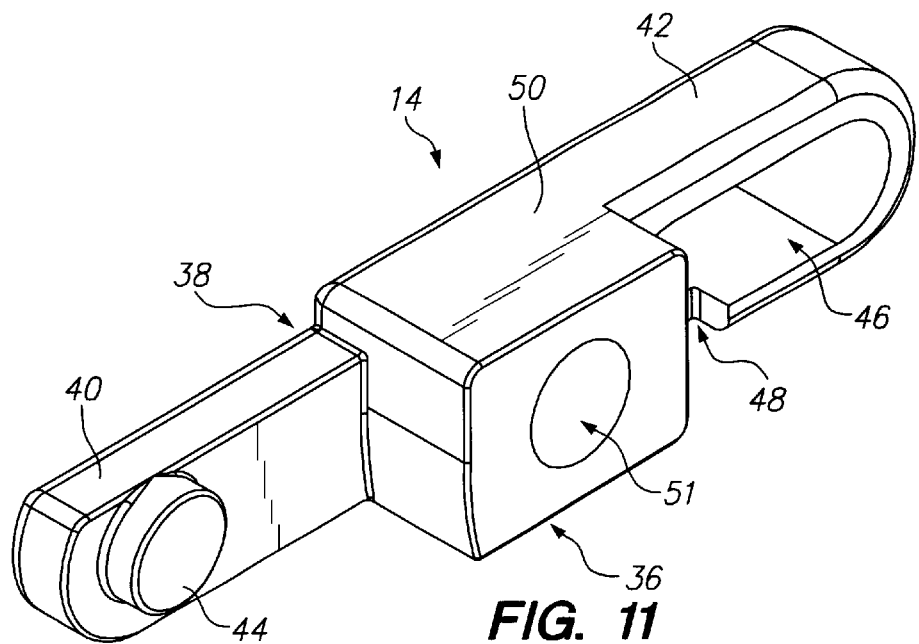
FIG. 11 is a top perspective view of a right edge link in the conveyor belt shown in FIG. 1.
Figure 12:
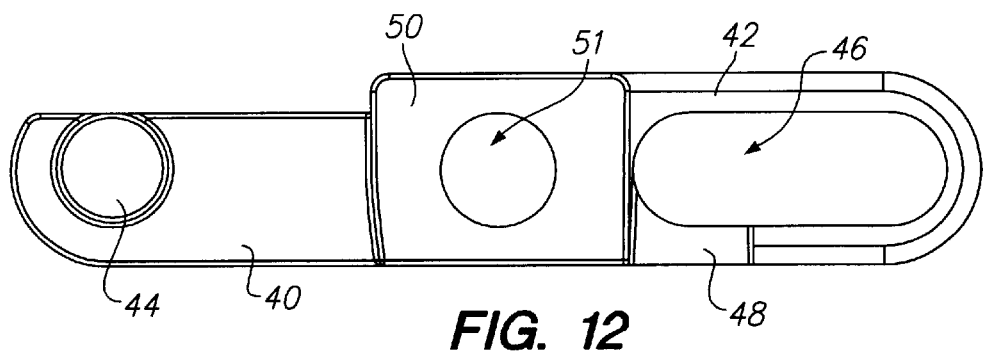
FIG. 12 is a side elevational view thereof.
Figure 13:
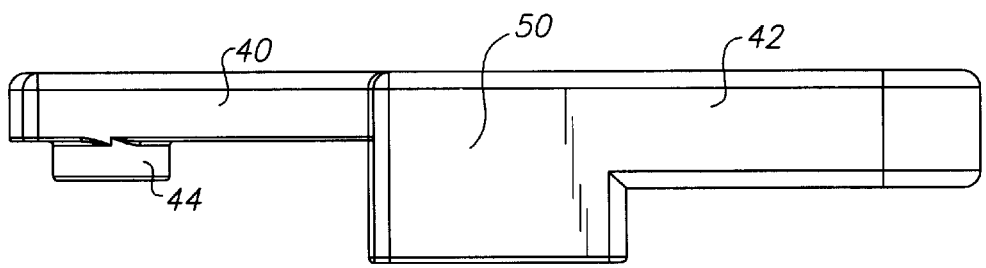
FIG. 13 is a top plan view thereof.

Referring to FIGS. 8–10, a left edge link 16 is shown in greater detail and FIGS. 11–13 illustrate a right edge link 14 in greater detail. Both the right and left edge links 14, 16 include an outward facing surface 36 and an inward facing surface 38 relative to the assembly of main body links 12 forming the conveyor belt 10. Both edge links 14, 16 further include a single first projecting leg 40 and a second projecting leg 42, with the first projecting leg including a boss 44 and the second projecting leg including a slot shaped opening 46 and a notch 48 on the under surface thereof, similar to those described above with respect to the main body links 12. The central area 55 also includes a through-opening 51 similar to that provided in main body links 12, as will be explained further below. In contrast to the main body links 12, the central area 50 of the edge links 14, 16 is preferably not recessed or hollowed so as to provide additional support and strength on the edges of the conveyor belt 10.

Figure 14:
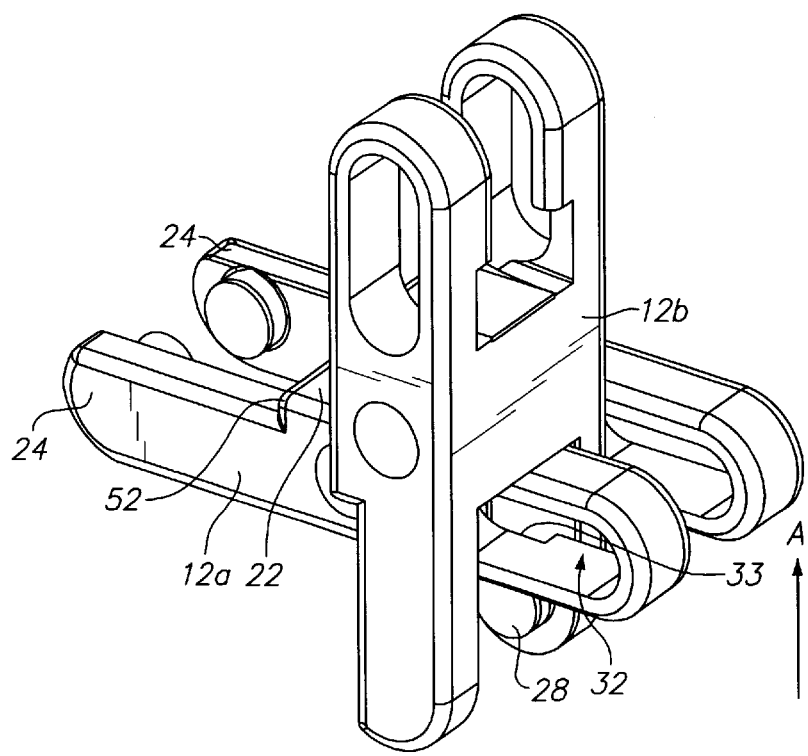
FIG. 14 illustrates a first step in the assembly of the main body links of the conveyor belt shown in FIG. 1.
Figure 15:
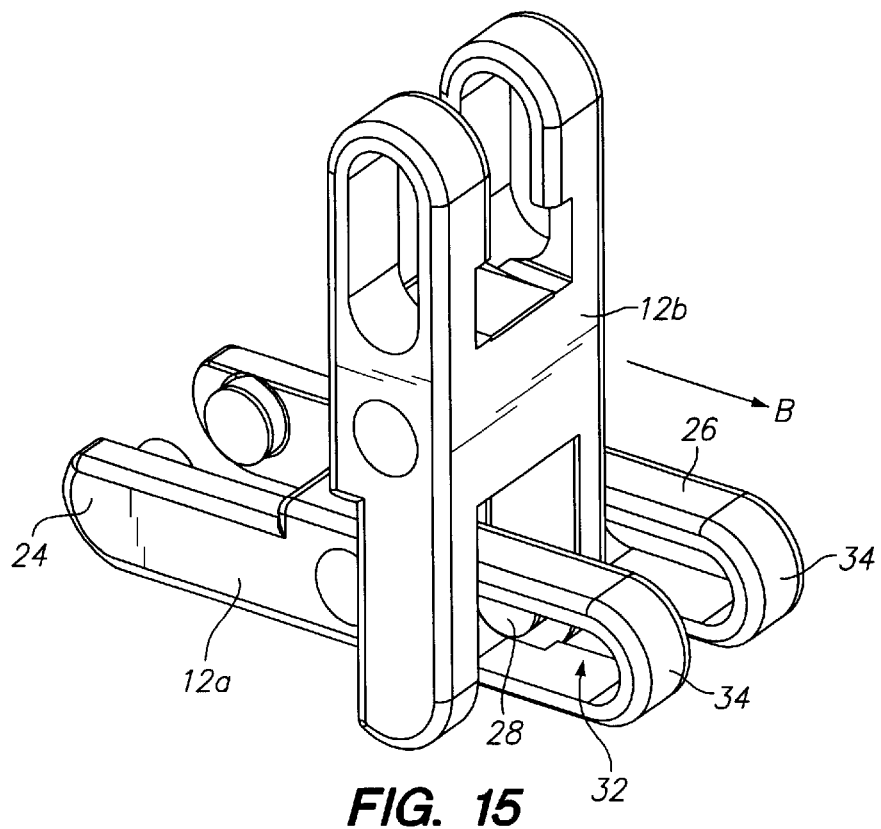
FIG. 15 illustrates a second step in the assembly thereof.
Figures 16A, 16B:
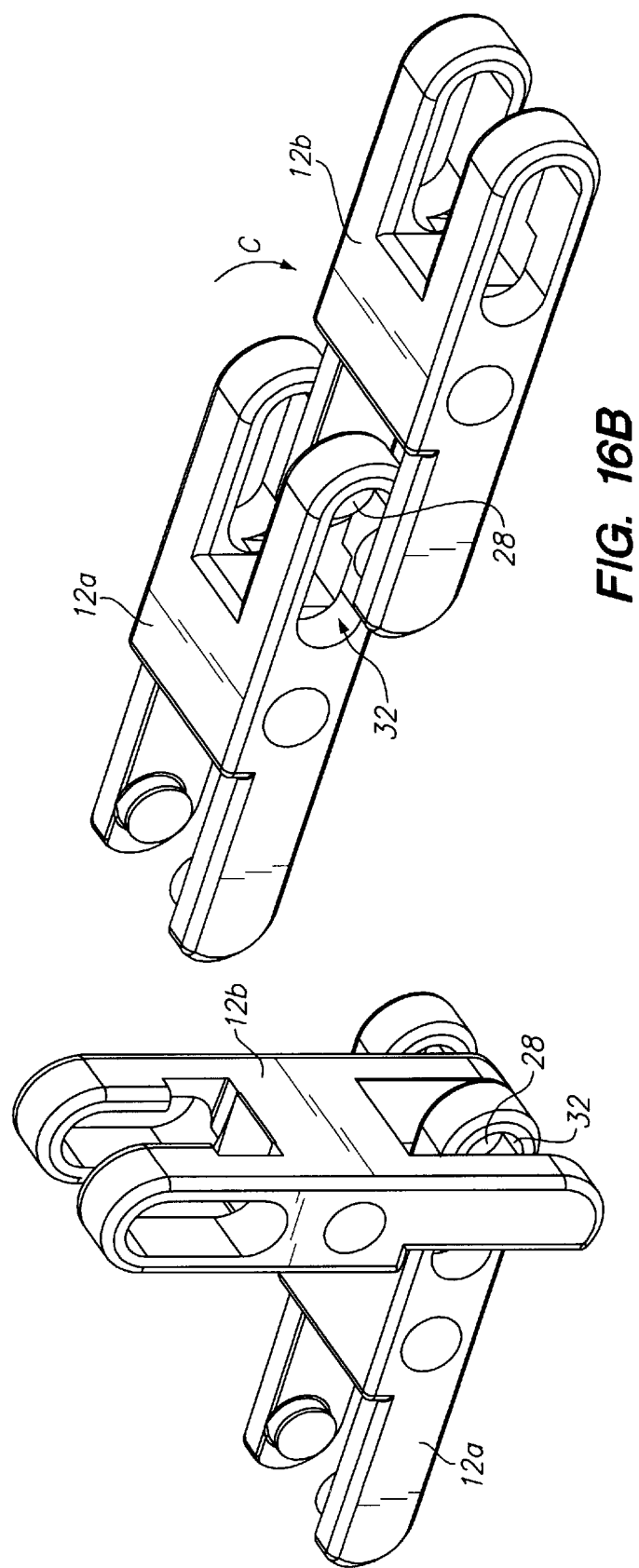
FIGS. 16A and 16B illustrate a third step and a fourth step, respectively, in the assembly thereof.
Figure 17:
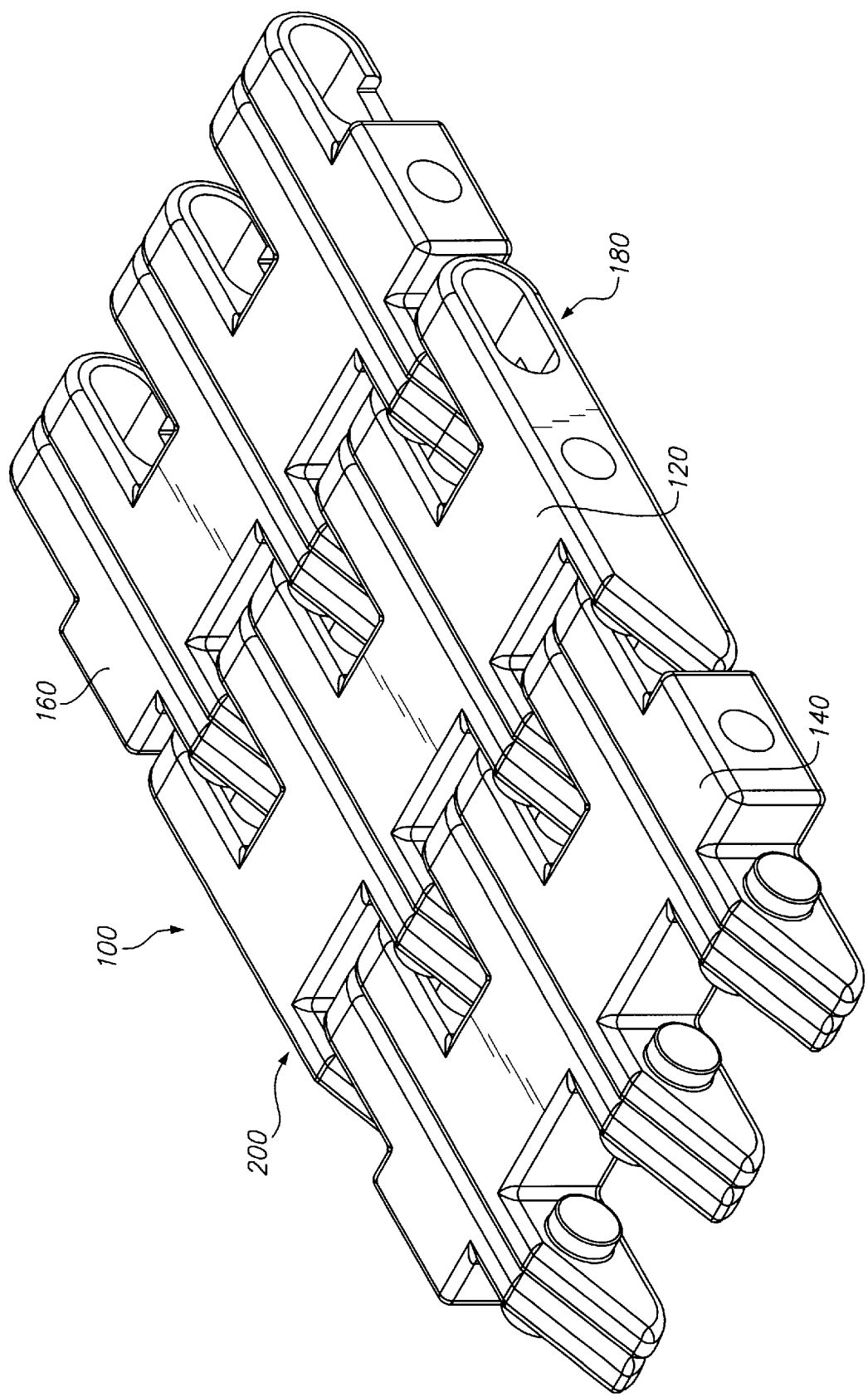
FIG. 17 is a top perspective view of a conveyor belt according to a second preferred embodiment of the present invention.
Figure 18:
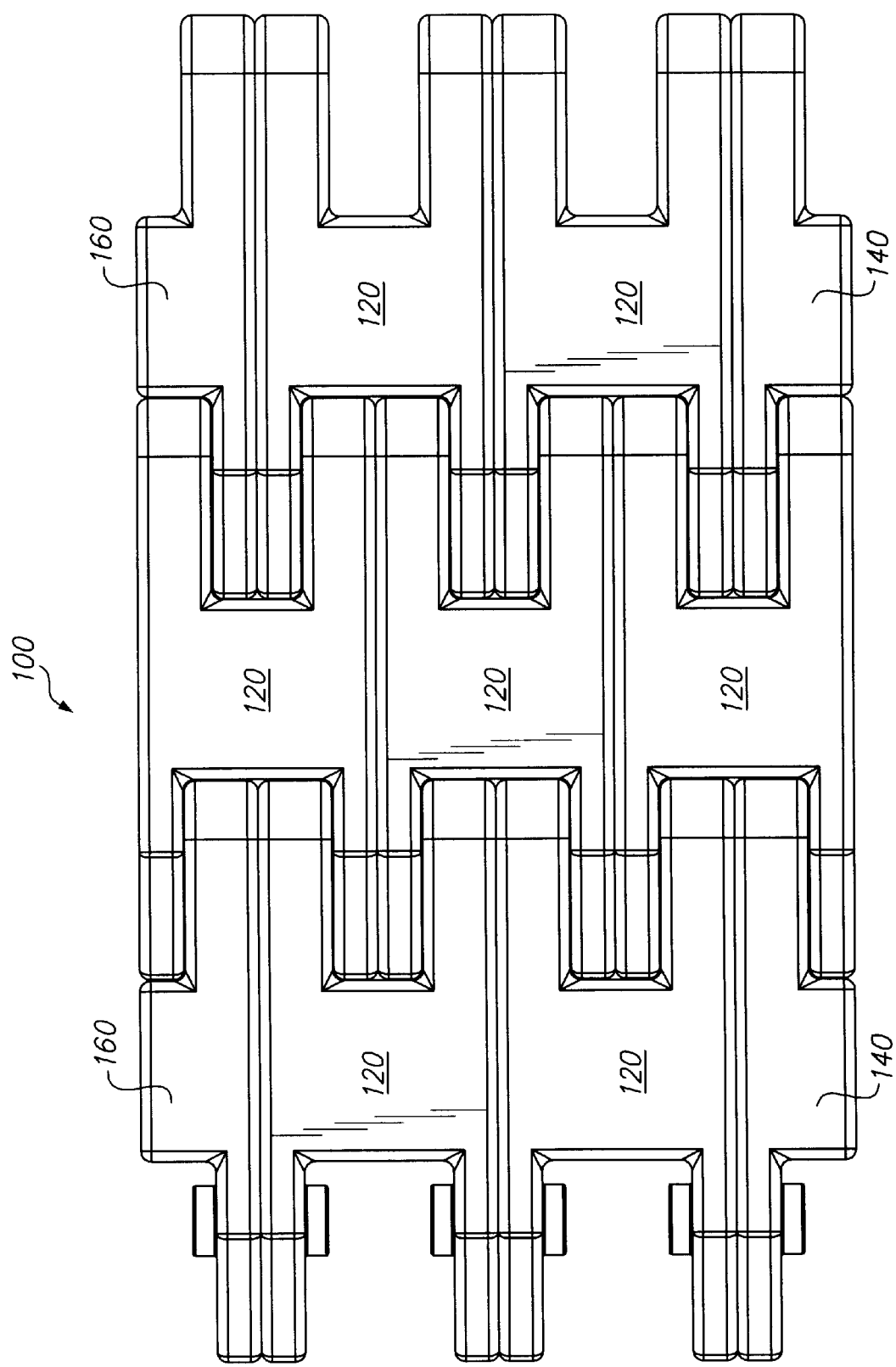
FIG. 18 is a top plan view thereof.
Figure 19:
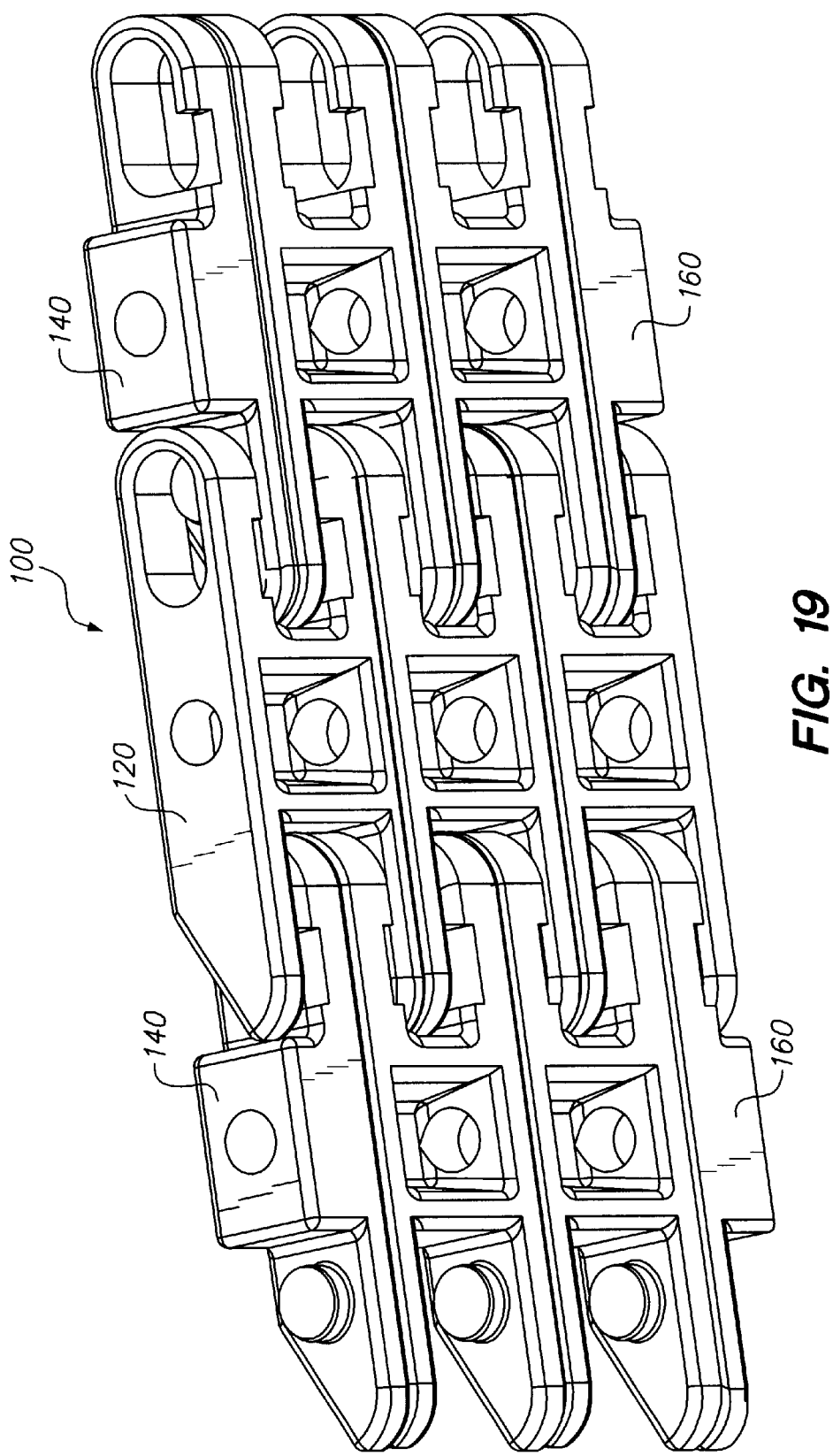
FIG. 19 is a bottom perspective view thereof.
Figure 20:
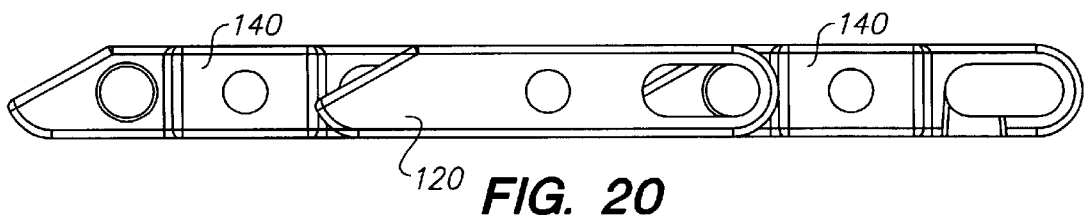
FIG. 20 is a side elevational view thereof.
Figure 21:
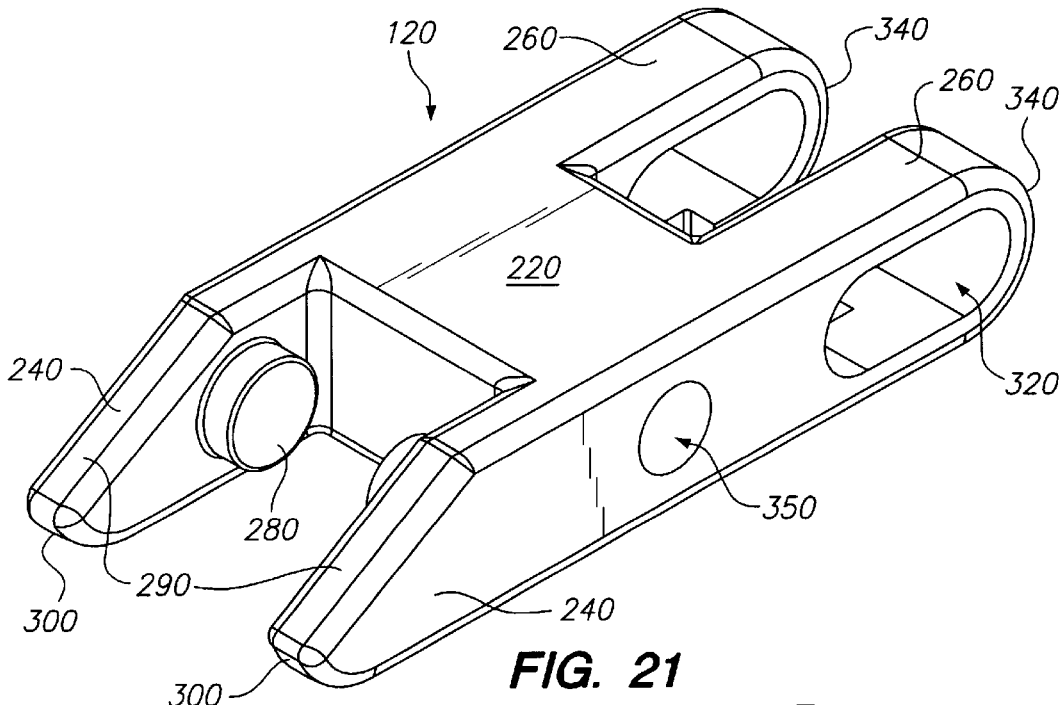
FIG. 21 is a top perspective view of a main body link in the conveyor belt shown in FIG. 17.
Figure 22:
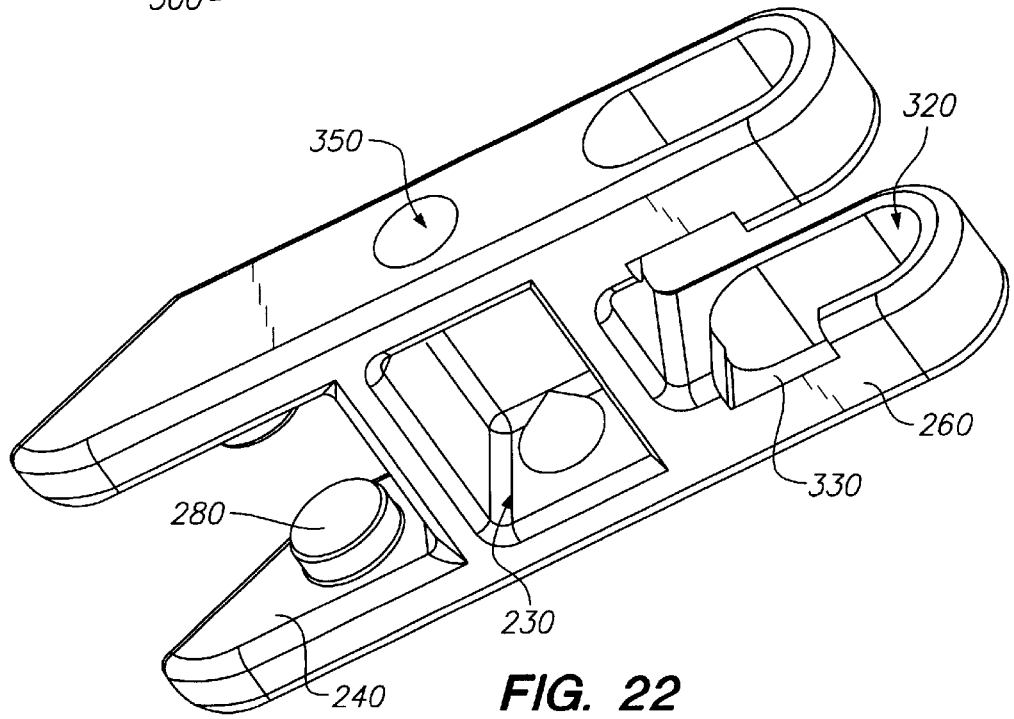
FIG. 22 is a bottom perspective view thereof.
Figure 26A:
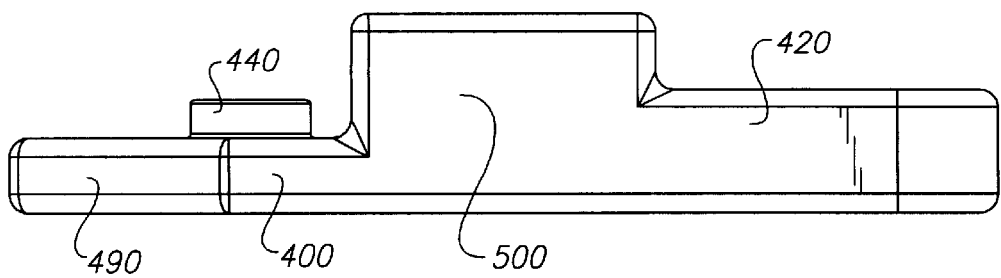
FIGS. 26A and 26B are top plan views thereof.
Figure 26B:
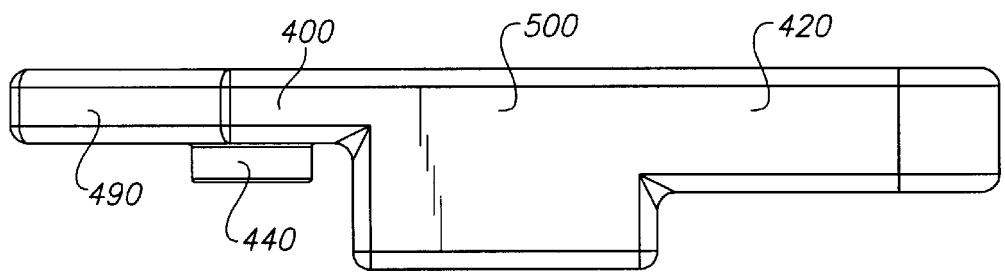
Figure 27A:
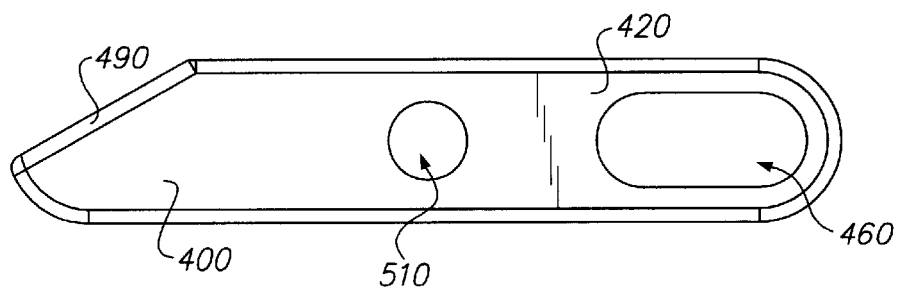
FIGS. 27A and 27B are side elevational views thereof.
Figure 27B:
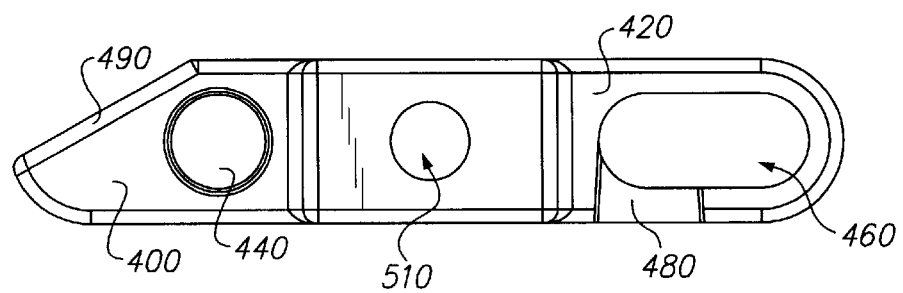

FIGS. 14–16B illustrate the assembly of the main body links 12, with the edge links 14, 16 being similarly assembled. Referring to FIG. 14, a first main body link 12a is positioned at a 90° angle to a second main body link 12b. As illustrated, the boss 28 is aligned with the notch 33 and then raised in a direction of arrow "A" such that the boss 28 is positioned within the slot shaped opening 32. Each of the main body links 12 includes a step down 52 between the first pair of projecting legs 24 and the central body area 22. The step down 52 allows the boss 28 to be able to interlock with the slot shaped opening 32. Referring to FIG. 15, once the boss 28 is aligned with the slot shaped opening 32, the second main body link 12b is shifted in the direction of arrow "B" to move to the free end 34 of the second leg 26 of the first main body link 12a. The translational movement of the second main body link 12b to the forward end of the slot shaped opening 32, as shown in FIG. 16A, seats the boss 28 within the slot shaped opening 32, and upon rotation of the second main body link 12b approximately 90° in the direction of arrow C, as shown in FIG. 16B, the second main body link 12b is thereby locked into position with adjoining main body links 12a disposed on either side thereof, although for the purpose of illustration, only a single main body link 12a is shown.

The edge links 18, 20 are connected to the main body links 12 in a similar fashion to that described above for the interlinking of main body links 12. The through-openings 35, 51 that are provided in the main body links and the edge links can be used for inserting a straight rod or the like for aligning the various links and rows of links, and thereby facilitating the splicing of the links to form the conveyor belt. The through-openings of this embodiment and the further embodiments described below can be in the form of a hole, as shown, or alternatively, a slot, as would be apparent to one skilled in the art.

When assembling the conveyor belt of the present invention, the first and second links to be interconnected should preferably be oriented at an approximately ninety degree angle in order to allow for the boss or projection of one link to pass through the notch in the slot on the second link. In a similar fashion, once assembled, the conveyor belt of the present invention may generally only be separated when the first and second links are again returned to an approximately ninety degree orientation with respect to one another. Preferably, the path along which the conveyor belt traverses does not include turns having ninety degree angles, and thus, the conveyor belt of the present invention is prevented from inadvertently separating during use.

FIGS. 17–20 illustrate a further preferred embodiment of the conveyor belt of the present invention, as generally designated by reference numeral 100. Conveyor belt 100 includes a plurality of main body links 120, right edge links 140, and left edge links 160. As described above with the first embodiment of the present invention, the right edge links 140 are utilized to form a substantially planar right edge 180 of the conveyor belt 100 and the left edge links 160 are utilized in order to form a substantially planar left edge 200 of the conveyor belt 100 so as to prevent the edges of the conveyor belt from snagging as the belt moves. Referring next to FIGS. 21–24, main body link 120 is illustrated in greater detail. Similar to the first above-described embodiment, main body link 120 includes a central body area 220 having a through-opening 350, as described above, a first pair of projecting legs 240, and a second pair of projecting legs 260. The central body area 220 may also be preferably provided with a recessed or hollowed area 230 on the underside of each of the main body links 120. The material in the central body area 220 is preferably removed so as to decrease the weight of each of the main body links 120, and thus decrease the weight of the assembled conveyor belt 100 without decreasing the strength or endurance thereof. The front surface of the recessed areas 230 also provide a flat engagement surface for the sprockets. As should be clear to one skilled in the art, the recessed areas in the central body areas can also be provided on the main body links of the first embodiment of the present invention, if so desired. Each of the first pair of projecting legs 240 includes a protruding boss 280 disposed on an inwardly facing surface thereof. The free end 300 of each of the first pair of projecting legs 240 includes a tapered surface 290 extending from a top surface to approximately a bottom surface of each of the first pair of projecting legs 240. Each of the second pair of projecting legs 260 includes a slot shaped opening 320 and a notch 330 within the lower surface of the slot opening 320 for receiving a projecting boss 280 from an adjoining link, as discussed further in detail below. The notch 330 in the slot shaped opening 320 is preferably disposed distal from the free end 340 of the second projecting link 260.

Figure 28A:
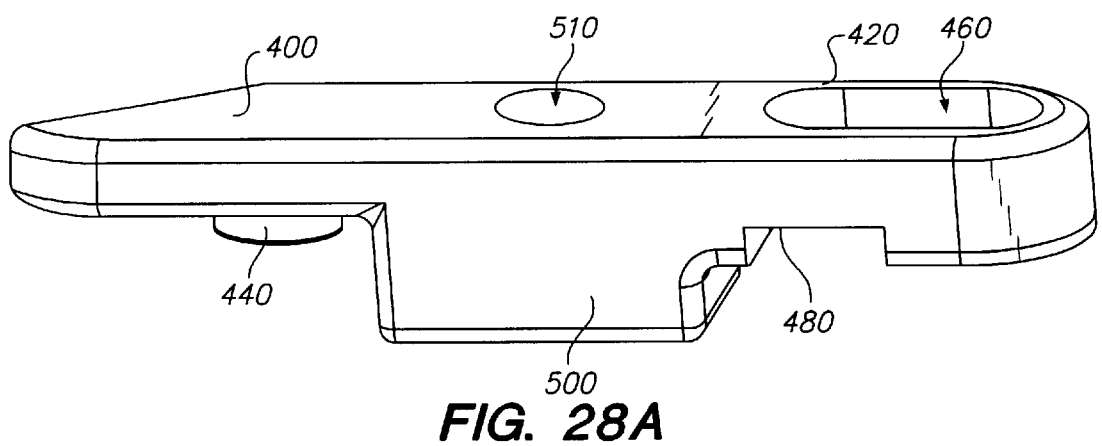
FIGS. 28A and 28B are bottom perspective views thereof.
Figure 28B:
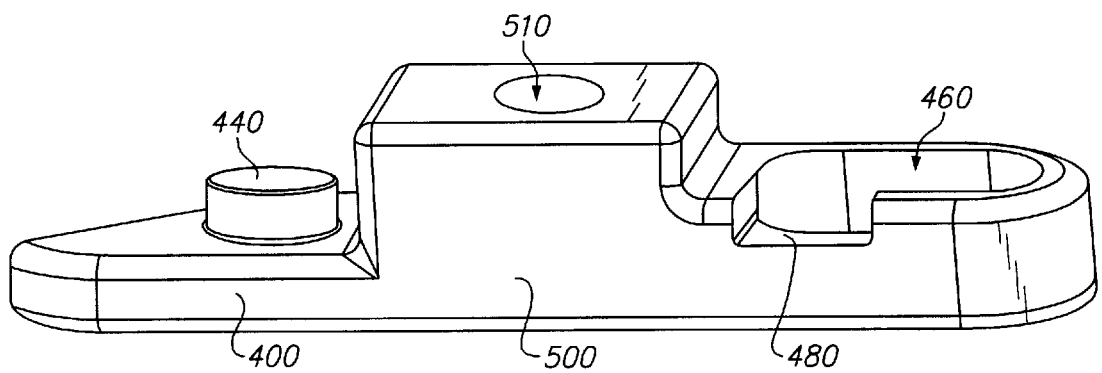

The opposing right edge and left edge links 140, 160 are shown in FIGS. 25–28 in greater detail. Each of the edge links 140, 160 includes an outward facing surface 360 and an inward facing surface 380. The outward facing surface is configured so as to provide a smooth edge surface for the assembled conveyor belt 100. The inward facing surface 380 is disposed towards the main body links 120 forming the assembled conveyor belt 100. Each of the edge links 140, 160 includes a first projecting leg 400 and a second projecting leg 420. Similar to the first embodiment discussed above, each of the first projecting legs 400 includes a projecting boss 440 while each of the second projecting legs 420 includes a slot shaped opening 460. In addition, in this embodiment each of the first projecting legs 400 is provided with a tapered surface 490. Each of the second projecting legs 420 further includes a notched area 480 within the perimeter of the slot shaped opening 460, as best shown in FIG. 28. Each of the edge links 140, 160 also include a central area 500 which is substantially planar so as to define an upper surface and a lower surface of each of the edge links. As discussed above, while it is preferred to provide the edge links with a solid central area 500, as opposed to a recessed or hollowed area, so as to increase the strength of the edge links in the assembled belt, it is of course within the scope of the present invention to also provide recessed areas therefore, as illustrated and described for the main body links 120. Further, the central area 500 is also provided with a through-opening 510 as described above.

Figure 29:
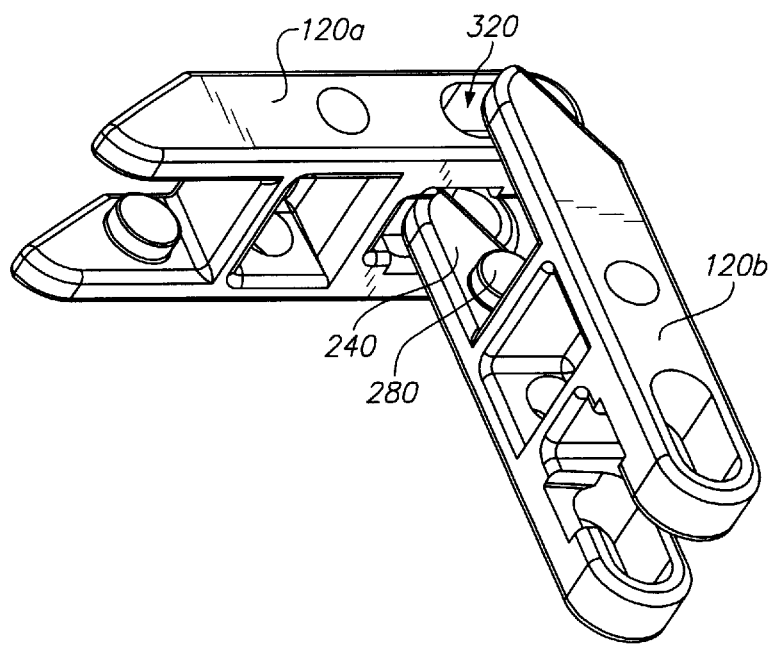
FIG. 29 illustrates a first step in the assembly of conveyor belt 100 shown in FIG. 17.
Figure 31:
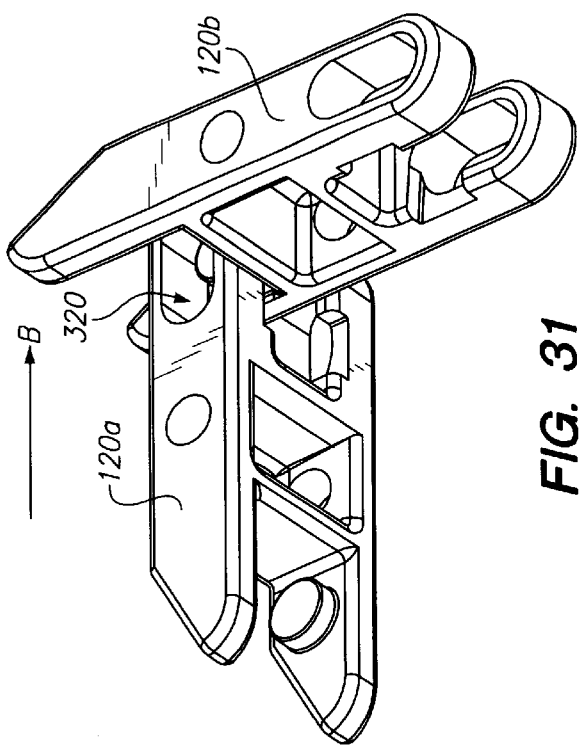
FIG. 31 illustrates a third step in the assembly thereof.
Figure 32:
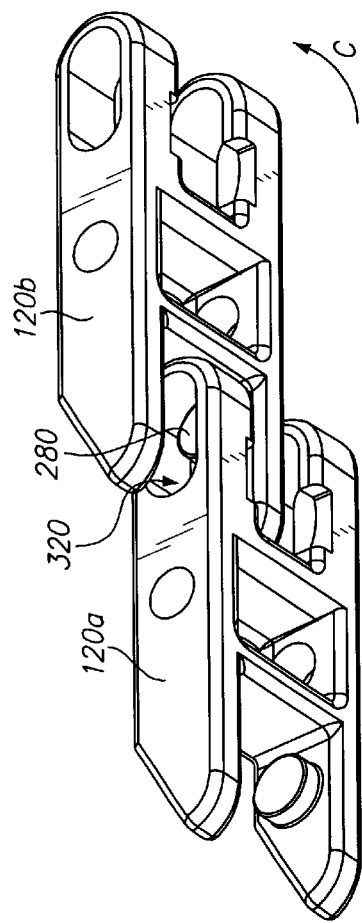
FIG. 32 illustrates a fourth step in the assembly thereof.
Figure 30:
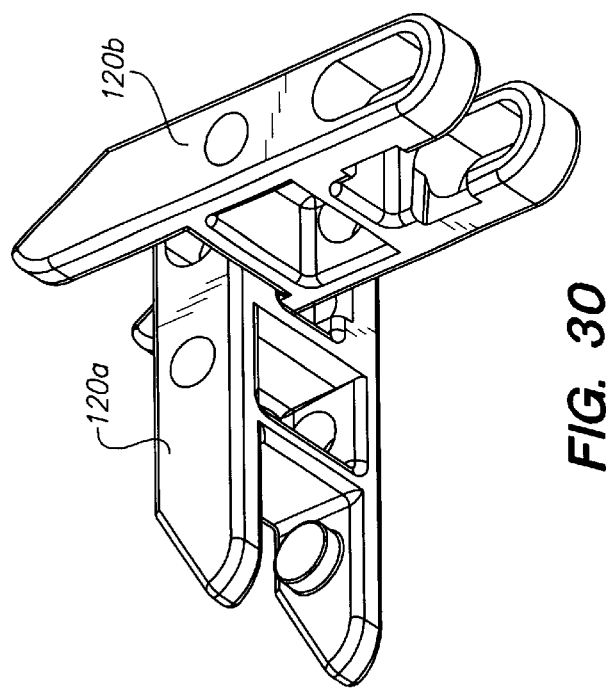
FIG. 30 illustrates a second step in the assembly thereof.

Referring to FIGS. 29–32, assembly of conveyor belt 100 is illustrated. As shown in FIG. 29, a second main body link 120b is aligned with a first main body link 120a from the bottom surface thereof and at a 90° angle. As shown in FIG. 30, the second main body link 120b is maintained at a 90° angle while the boss 280 on the first projecting leg 240 is inserted into the slot shaped opening 320 of the first main body link 120a. Referring next to FIG. 31, the second main body link 120b is maintained at a 90° angle while simultaneously being shifted in the direction of arrow "B" until the boss 280 contacts the end of the slot shaped opening 320 in the first main body link 120a. And finally, referring to FIG. 32, the second main body link 120b is rotated 90° as shown by arrow "C" so as to form substantially planar conveyor belt surface and lock the boss 280 within the slot shaped opening 320 of the adjoining link. Although only two main body links 120 are illustrated in FIGS. 29–32, it should be apparent to one skilled in the art that adjacent links are required in order to successfully maintain the interlocking relationship between the boss 280 and the slot shaped openings 320. Further, although the assembly is not illustrated, it should be clear that the edge links 160 and 180 are similarly assembled once a sufficient number of main body links 120 have been interconnected so as to form a conveyor belt 100 having the required width.

Figure 33:
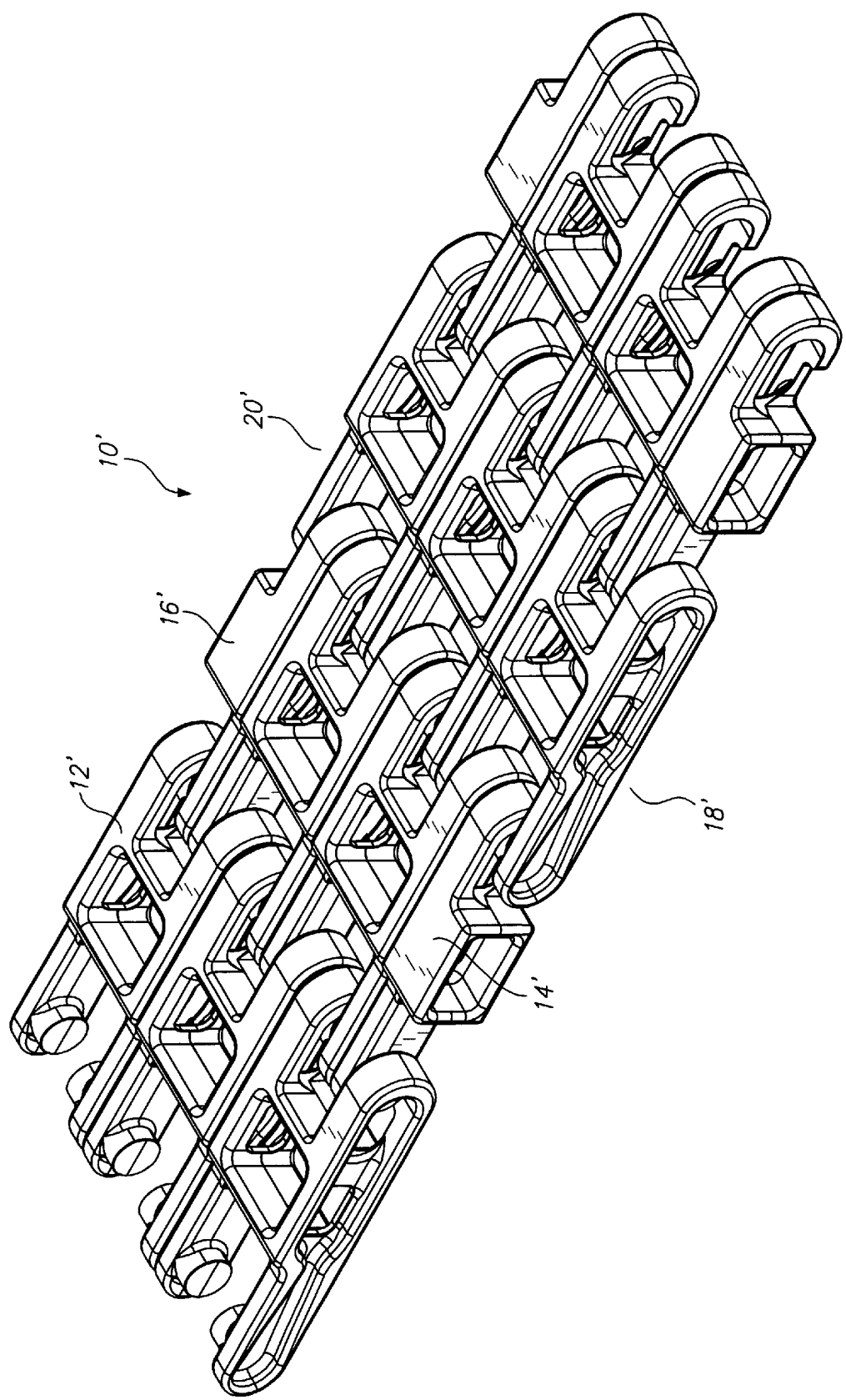
FIG. 33 is a top perspective view of a conveyor belt according to a third preferred embodiment of the present invention.
Figure 34:
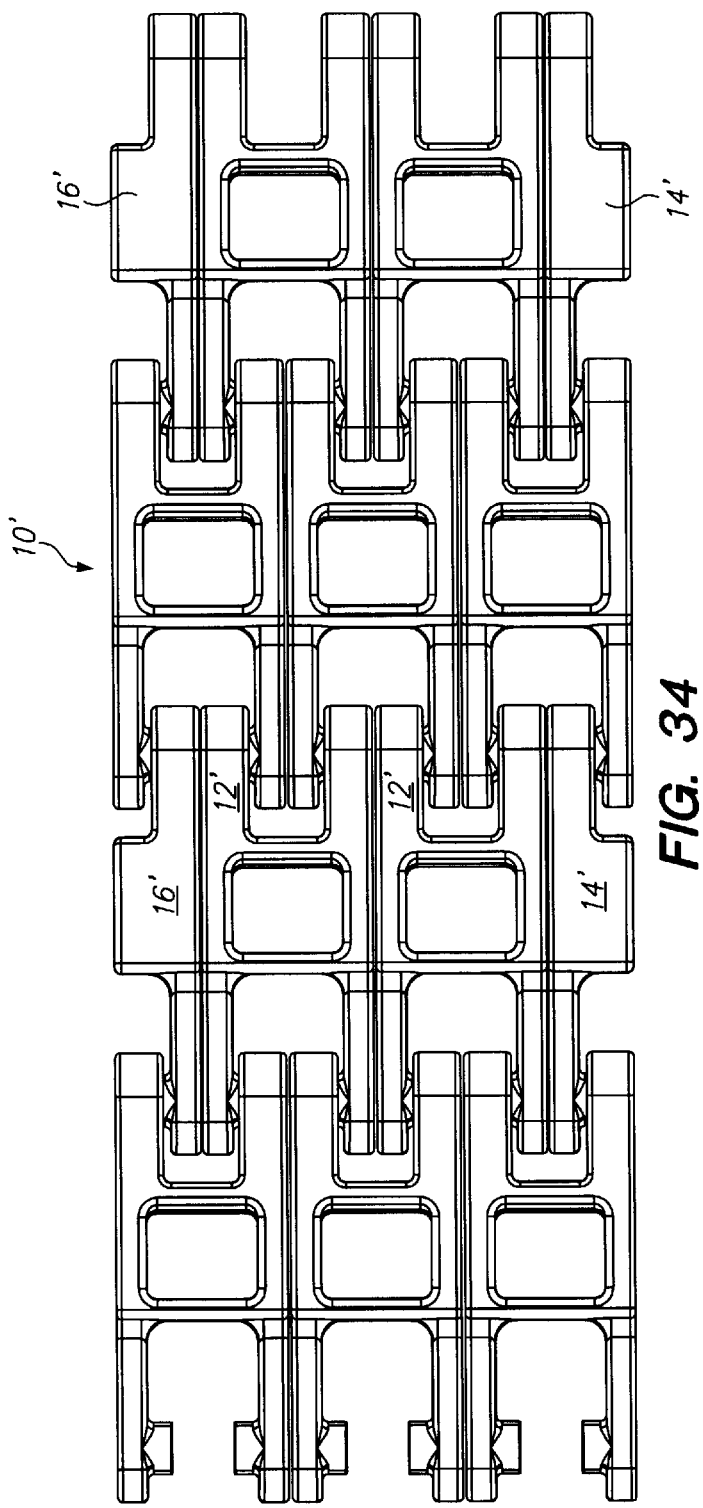
FIG. 34 is a top plan view thereof.
Figure 35:
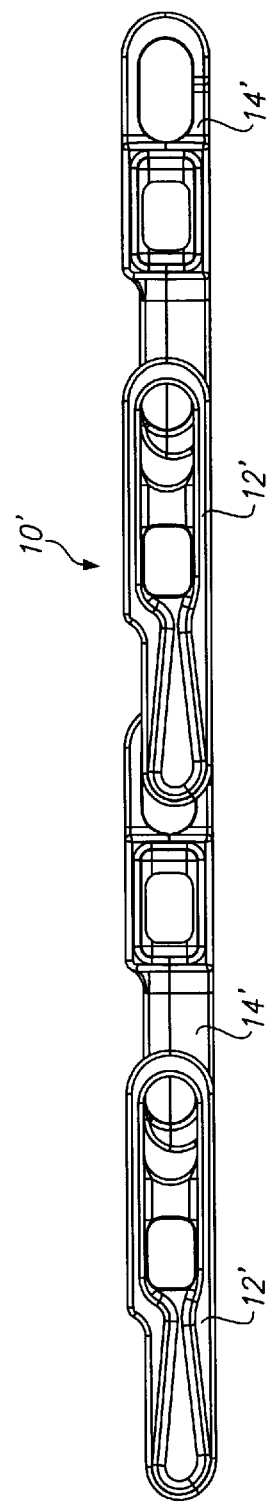
FIG. 35 is a side elevational view thereof.

Referring to FIGS. 33–35, a conveyor belt according to a third embodiment of the present invention is designated generally by reference numeral 10'. The conveyor belt 10' includes a plurality of main body links 12', right edge links 14', and left edge links 16'. The main body links 12' are arranged in interconnected transverse rows so as to define a desired width of conveyor belt 10', and a plurality of rows formed from the main body links 12' are then interconnected in a longitudinal direction so as to form the desired length for the conveyor belt 10'. A plurality of right edge links 14' are disposed on the right edge 18' of the main body links 12' while the left edge links 16' form the edge treatment for the left edge 20' of the main body links 12'.

Figure 37:
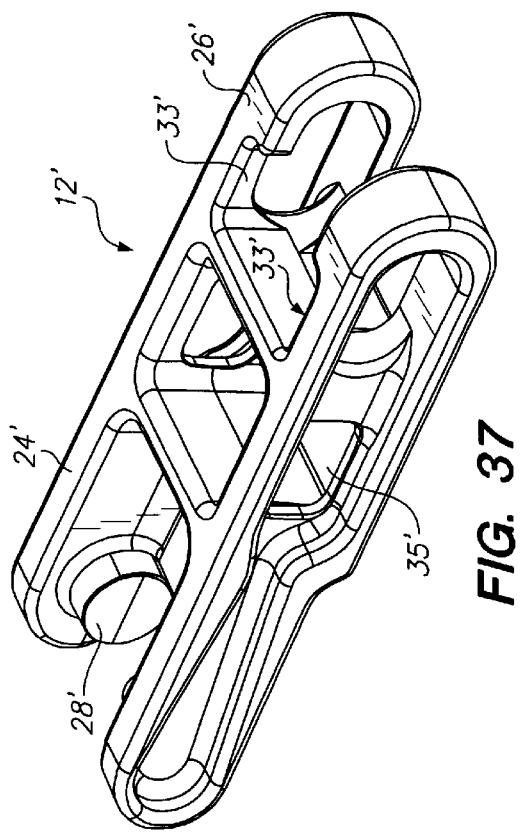
FIG. 37 is a bottom perspective view thereof.
Figure 39:
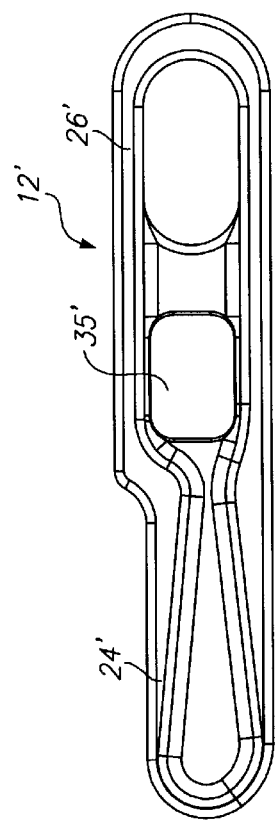
FIG. 39 is a side elevational view thereof.
Figure 36:
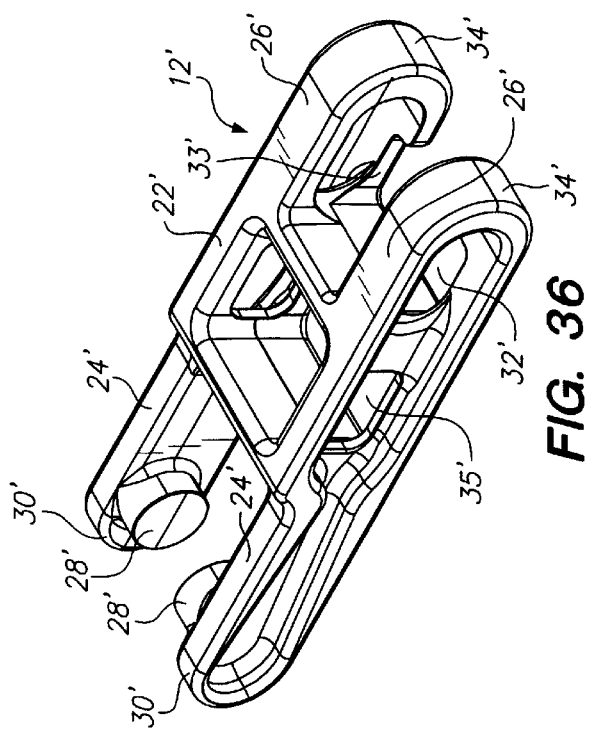
FIG. 36 is a top perspective view of a main body link in the conveyor belt shown in FIG. 33.
Figure 38:
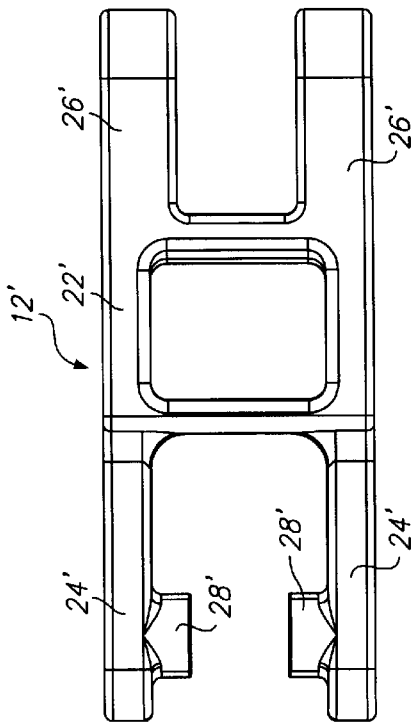
FIG. 38 is a top plan view thereof.
Figure 43A:
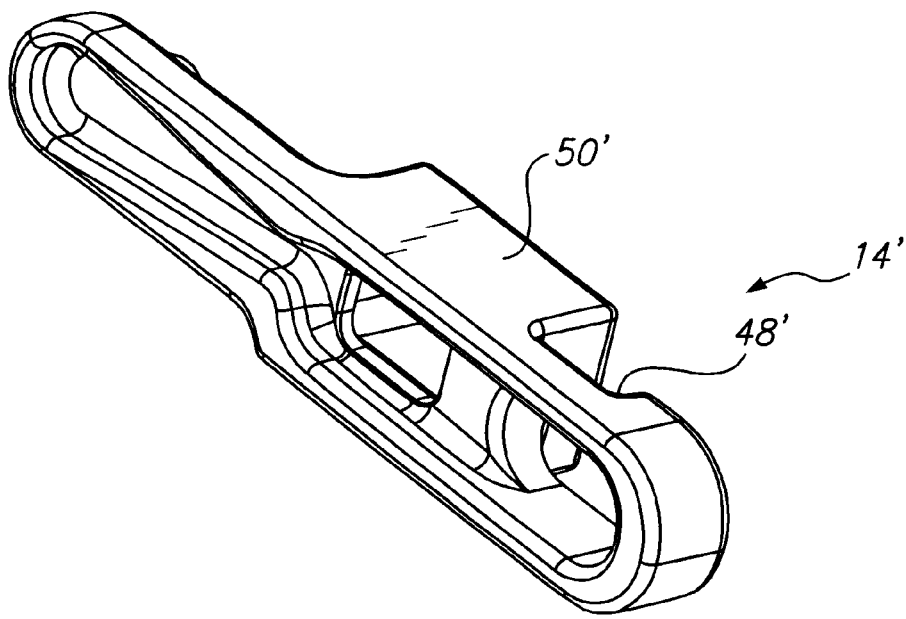
FIGS. 43A and 43B are bottom perspective views thereof.
Figure 43B:
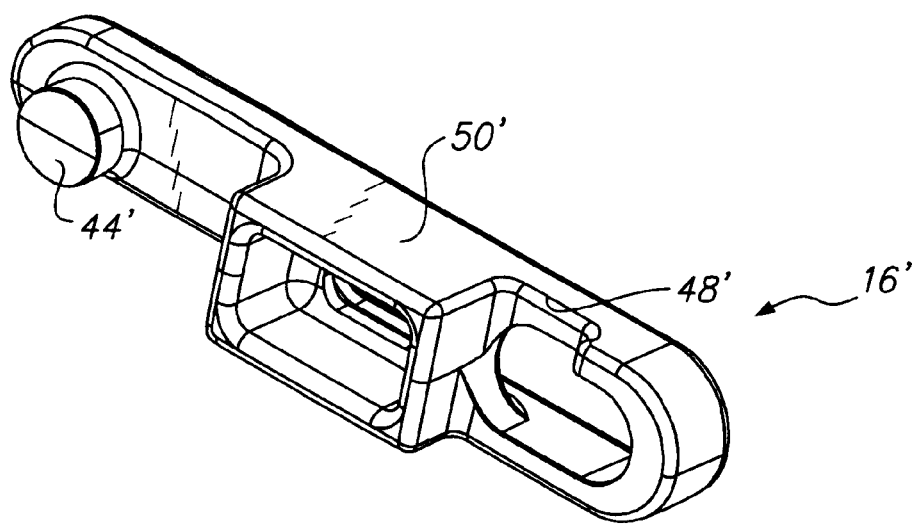

Referring to FIGS. 36–39, the main body link 12' is shown in greater detail. More specifically, main body link 12' includes a central body area 22', a first pair of projecting legs 24' and a second pair of projecting legs 26'. In contrast to the first disclosed embodiment, the link material within the main body area 22' is preferably removed in order to form a substantially open region which reduces the weight of the link 10', without substantially reducing the strength thereof. As best shown in FIG. 39, main body links 12' also include a central slot or though-opening 35', for use in splicing the links together as explained in detail above for opening 35. Each of the first projecting legs 24' further include an inwardly projecting boss 28' disposed proximal to the free end 30' of each of the first projecting legs. Each of the second projecting legs 26' includes a slot shaped opening 32' extending entirely through each of the legs 26 in the transverse direction as best shown in FIG. 37. The dimensions of the link are substantially similar to those of the first embodiment and are preferably chosen so that the slot in the leg has a length greater than two times that of the diameter of the boss, although other ratios could of course also be used. As shown in FIG. 37, the underside of each second projecting leg 26' further includes a notch 33', the purpose of which was explained in detail above with respect to notch 33.

Referring to FIGS. 40–43, a left edge link 16' and a right edge link 14' are shown in greater detail. Both the right and left edge links 14', 16' include an outward facing surface 36' and an inward facing surface 38' relative to the assembly of main body links 12' forming the conveyor belt 10'. Both edge links 14', 16' further include a single first projecting leg 40' and a second projecting leg 42', with the first projecting leg including a boss 44' and the second projecting leg including a slot shaped opening 46' and a notch 48' on the under surface thereof, similar to those described above with respect to the main body links 12'. The central area 50' also includes a slot or through-opening 51' similar to that provided in main body links 12', as will be explained further below. In contrast to the main body links 12', the central area 50' of the edge links 14', 16' is preferably not recessed or hollowed so as to provide additional support and strength on the edges of the conveyor belt 10'. However, it is preferable that outward facing surfaces 36' are contoured so as to remove unnecessary material, and thereby reduce the weight of the conveyor belt 10'.

Assembly of the main body links 12' and the edge links 14', 16' is substantially similar to that described above for the first embodiment of conveyor belt 10, and a detailed description thereof is therefore omitted.

The above-described conveyor belt configuration is ideally suited for a plastic construction. The same configuration may also be used for constructing conveyor belts from metal or ceramic materials, or any other desired material,, as would be appreciated by one skilled in the art.

Further, while the modular conveyor belt of the present invention has been described as having modular links comprising individual links, it is also within the scope of the present invention to form a modular link, or module, comprised of a plurality of integrally formed individual links or having a unified configuration. The thus formed modules would thereafter be joined together in substantially the same manner as described above for the individual links.

While the present invention has been described with preferred embodiments, it is to be understood that variations and modifications may be resorted to as will be apparent to those skilled in the art. Such variations and modifications are to be considered within the purview and the scope of the present invention.

I claim:
1. A modular conveyor belt assembly comprising:
    a plurality of modular links, each of said modular links including at least one pair of first projecting legs, and at least one pair of second projecting legs, said first projecting legs each having a substantially planar inner leg surface, a substantially planar outer leg surface, and a projecting engagement element extending from each of said inner leg surfaces, and said second projecting legs each having an inner leg surface, an outer leg surface, and an elongated through-opening extending transversely through said second projecting leg from said inner leg surface to said outer leg surface;

wherein said plurality of modular links are interconnected to form said conveyor belt, a first one of the engagement elements of a first one of said plurality of modular links cooperating with the through-opening of a second one of said plurality of modular links and a second one of the engagement elements of the first one of the plurality of modular links cooperating with the through-opening of a third one of said plurality of modular links.

2. The assembly of claim 1 wherein each of said through-openings includes a notch extending transversely from said inner leg surface of said second projecting leg.

3. The assembly of claim 2 wherein said notch is dimensioned for receiving one of said engagement elements therein.

4. The assembly of claim 1 wherein each of said modular links includes substantially planar opposing sides.

5. The assembly of claim 4 wherein said central body area is substantially open.

6. The assembly of claim 4 wherein said central body area is substantially solid.

7. The assembly of claim 1 wherein each of said modular links includes a central body area.

8. A modular conveyor belt assembly comprising:
a plurality of modular links, each of said modular links including a pair of first projecting legs and a pair of second projecting legs, said first projecting legs each having a substantially planar inner leg surface, a substantially planar outer leg surface, and an inwardly projecting engagement element extending from each of said inner leg surfaces, and said second projecting legs each having an inner leg surface, an outer leg surface, and an elongated through-opening extending transversely through said second projecting leg from said inner leg surface to said outer leg surface;
wherein said plurality of modular links are interconnected to form said conveyor belt through engagement of the engagement elements in the elongated through-openings.

9. The assembly of claim 8 wherein each of said through-openings includes a notch extending transversely from said inner leg surface of said second projecting leg.

10. The assembly of claim 9 wherein said notch is dimensioned for receiving one of said engagement elements therein.

11. The assembly of claim 8 wherein each of said modular links includes substantially planar opposing sides.

12. The assembly of claim 8 wherein each of said modular links includes a central body area.

13. The assembly of claim 12 wherein said central body area is substantially solid.

14. The assembly of claim 12 wherein said central body area is substantially open.

15. A modular link for use in a conveyor belt, said link comprising:
a central portion and first and second pairs of projecting legs, said central portion and said first and second pairs of projecting legs defining opposing lateral sides of said modular link;
an engagement element extending inwardly only from an inner surface of each of said first projecting legs; and
an elongated slot formed transversely through each of said second projecting leg wherein each of said slots includes a transverse notch on one surface thereof.

16. The link of claim 15 wherein said central portion is substantially open.

17. The link of claim 15 wherein said notch is dimensioned for receiving an engagement element of an adjacent modular link.

18. The link of claim 15 wherein said central portion is substantially solid.

19. A method of assembling modular links of a conveyor belt comprising:
positioning a first main link substantially perpendicular to a second main link and a third main link;
aligning a first projecting engagement element of the first main link with a transverse notched opening of the second main link and a second projecting engagement element of the first main link with a transverse notched opening of the third main link;
positioning the first and second projecting engagement elements of the first main link relative to the notched openings of the second and third main links such that the projecting engagement elements of the first main link are positioned within a respective slotted travel path of the second main link and the third main link;
moving the first main link substantially parallel relative to a plane of the second main link and the third main link such that the projecting engagement elements travels horizontally within the respective slotted travel paths of the second and third main links;
rotating the first main link relative to the second and third main links to form a planar connection therebetween.

20. The method of claim 19 wherein rotating the first main link approximately ninety degrees such that the first main link is substantially planar with the second main link and the third main link thereby locks together the first main link and the second and third main links.

21. The method of claim 19 wherein the notched opening is provided at one end of the slotted travel path and the projecting engagement element moves from the one end of the slotted travel path to an opposing end of the slotted travel path.

* * * * *